United States Patent
Cai et al.

(10) Patent No.: US 11,505,237 B2
(45) Date of Patent: Nov. 22, 2022

(54) CHILD SWING STEERING VEHICLE

(71) Applicant: Goodbaby Child Products Co., LTD., Jiangsu (CN)

(72) Inventors: Hui Cai, Kunshan (CN); Tiewen Zhu, Kunshan (CN); Peng Liu, Kunshan (CN)

(73) Assignee: Goodbaby Child Products Co., LTD., Jiangsu (CN)

( * ) Notice: Subject to any disclaimer, the term of this patent is extended or adjusted under 35 U.S.C. 154(b) by 92 days.

(21) Appl. No.: 17/046,980

(22) PCT Filed: Apr. 12, 2018

(86) PCT No.: PCT/CN2018/082798
§ 371 (c)(1),
(2) Date: Oct. 12, 2020

(87) PCT Pub. No.: WO2019/196055
PCT Pub. Date: Oct. 17, 2019

(65) Prior Publication Data
US 2021/0146988 A1   May 20, 2021

(51) Int. Cl.
*B62D 1/22*   (2006.01)
*B62K 5/10*   (2013.01)
*B62D 61/12*  (2006.01)

(52) U.S. Cl.
CPC ............ *B62D 1/22* (2013.01); *B62D 61/125* (2013.01)

(58) Field of Classification Search
CPC ........ B62D 1/22; B62D 61/125; B62D 61/12; A63C 17/04; B62K 5/00; B62K 5/003; B62K 5/08; B62K 5/10
See application file for complete search history.

(56) References Cited

U.S. PATENT DOCUMENTS

| 4,012,054 A | 3/1977 | Moore |
| 4,279,429 A * | 7/1981 | Hopkins ............. B62K 5/02 280/282 |

(Continued)

FOREIGN PATENT DOCUMENTS

| CN | 205220865 U | 5/2016 |
| CN | 205311787 U | 6/2016 |
| CN | 205311789 U | 6/2016 |

OTHER PUBLICATIONS

Written Opinion for PCT/CN2018/082798 (dated Jan. 17, 2019) (4 pages).

(Continued)

*Primary Examiner* — Frank B Vanaman
(74) *Attorney, Agent, or Firm* — Peter L. Brewer; Thrive IP

(57) ABSTRACT

A child swing steering vehicle comprises: a vehicle frame; wheels disposed at the bottom of the vehicle frame; steering wheels disposed in rear or front of the wheels; a steering mechanism to steer the steering wheels when the child's body is tilted to the left or right, the steering wheels are connected to the vehicle frame via the steering mechanism; the steering vehicle further comprising auxiliary wheels; the left and right sides of the vehicle frame are respectively provided with at least one auxiliary wheel; a sum of the number of the wheels and the steering wheels is greater than or equal to three, and the bottom of the wheels and the bottom of the steering wheels are both located in the same plane; when the child swing steering vehicle is turning, the bottom of the auxiliary wheel is located in the plane, thereby enabling a good stability in steering.

20 Claims, 17 Drawing Sheets

(56) References Cited

U.S. PATENT DOCUMENTS

| | | | | |
|---|---|---|---|---|
| 4,384,731 | A * | 5/1983 | Webb | A63C 17/28 |
| | | | | 280/87.01 |
| 4,744,576 | A * | 5/1988 | Scollan, Jr. | A63C 17/015 |
| | | | | 280/11.211 |
| 5,064,213 | A * | 11/1991 | Storch | B62H 1/12 |
| | | | | 280/301 |
| 6,296,266 | B1 | 10/2001 | Martin | |
| 6,981,710 | B2 * | 1/2006 | Cheng | A63C 17/01 |
| | | | | 280/87.03 |
| 2002/0070514 | A1 * | 6/2002 | Costa, Jr. | A63C 17/004 |
| | | | | 280/11.226 |
| 2005/0285363 | A1 * | 12/2005 | Joung | A63C 17/1436 |
| | | | | 280/842 |
| 2006/0175109 | A1 | 8/2006 | Cheng | |
| 2008/0217085 | A1 * | 9/2008 | Wernli | B62K 3/002 |
| | | | | 280/266 |
| 2018/0022390 | A1 * | 1/2018 | Cai | B60K 17/165 |
| | | | | 180/252 |

OTHER PUBLICATIONS

International Search Report for PCT/CN2018/082798 (dated Jan. 17, 2019) (3 Pages).
WIPO English Translation of Written Opinion for PCT/CN2018/082798 (dated Oct. 11, 2020) (2 pages).
WIPO English Translation of International Search Report for PCT/CN2018/082798 (dated Jan. 17, 2019) (2 pages).

* cited by examiner

CHILD SWING STEERING VEHICLE

This application represents the National Phase under 35 U.S.C. § 371 of International Application No. PCT/CN2018/082798, entitled, "CHILD SWING STEERING VEHICLE," and filed internationally on Apr. 12, 2018.

The foregoing PCT/CN2018/082798 application is incorporated herein by reference in its entirety.

TECHNICAL FIELD OF THE INVENTION

The present disclosure relates to the field of children products, in particular to a child swing steering vehicle which realizes steering by swinging a body side to side.

BACKGROUND OF THE INVENTION

In the prior art, a child swing steering vehicle is capable of steering by swinging a body side to side and used for children to ride and play, and can be a child electric vehicle. This kind of child swing steering vehicle capable of steering by swinging a body side to side, generally comprises a vehicle frame, and a front wheel assembly and a rear wheel assembly arranged at the bottom of the vehicle frame, wherein at least one of the front wheel assembly and the rear wheel assembly is connected to the vehicle frame via a steering mechanism, such that when the child tilts the body to the left or right, it allows the vehicle frame to swing relative to the front wheel assembly or the rear wheel assembly to realize steering. However, during the steering process, due to the vehicle frame swings to the left side or the right side relative to the wheels, there is a risk that the vehicle frame swings too much and rolls over, and the vehicle body is not stable enough when steering.

SUMMARY OF THE INVENTION

Aiming at the above problem, the purpose of the present disclosure is to provide a child swing steering vehicle which realizes steering by swinging the body side to side, which has good stability when steering.

To achieve the above purpose, the present disclosure employs the following technical solution:

a child swing steering vehicle, comprises:
a vehicle frame;
a seat arranged on the vehicle frame for a child to ride;
wheels arranged at the bottom of the vehicle frame;
steering wheels arranged in rear or front of the wheels; and
a steering mechanism to steer the steering wheels when the child's body is tilted to the left or right, the steering wheels are connected to the vehicle frame via the steering mechanism;

the child swing steering vehicle further comprises auxiliary wheels; the left and right sides of the vehicle frame are respectively provided with at least one of the auxiliary wheels; a sum of the number of the wheels and the steering wheels is greater than or equal to three, and the bottom of the wheels and the bottom of the steering wheels are both located in the same plane; the auxiliary wheel on the left side of the vehicle frame is located on the left side of the wheels and the steering wheels, and the auxiliary wheel on the right side of the vehicle frame is located on the right side of the wheels and the steering wheels; when the child swing steering vehicle is turning, the bottom of at least one of the auxiliary wheels is located in the plane.

In an embodiment, the auxiliary wheels are ball wheels, off-centered omni-directional wheels, or directional wheels.

In an embodiment, the vehicle frame comprises a frame body and two handle frames respectively extending from the left and right sides of the frame body, the handle frames are fixedly connected to the frame body, and the auxiliary wheels are arranged at the bottom of the handle frames.

In an embodiment, the vehicle frame comprises a frame body and a handle frame, the frame body is rotatably connected to the handle frame and capable of turning left and right, the wheels are arranged at the bottom of the frame body, and the steering wheels are arranged at the bottom of the frame body via the steering mechanism;

the left and right sides of the handle frame are respectively provided with at least one auxiliary wheel;

when the child swing steering vehicle goes straight, the bottom of the wheels, the bottom of the steering wheels, and the bottom of the auxiliary wheels are all located in the same plane; and when the child swing steering vehicle is turning, the bottom of the wheels, the bottom of at least one of the steering wheels, and the bottom of the auxiliary wheels are located in the same plane.

In an embodiment, the frame body is rotatably connected to the handle frame via a first pivot, and the first pivot extends along a front-rear direction.

In an embodiment, the handle frame is arranged between the wheels and the steering wheels.

In an embodiment, the steering wheels are connected with a wheel shaft, the steering mechanism comprises a steering base fixedly connected to the wheel shaft, and a fixed base fixedly connected to the vehicle frame, the steering base is rotatably connected with the fixed base via a rotating shaft fixed on the fixed base, an acute angle is formed between a shaft axis of the rotating shaft and a horizontal plane so as to drive the steering base to rotate when the child's body is tilted to the left or right.

In an embodiment, the steering mechanism further comprises a restoration device for restoring the child swing steering vehicle from turning to straight going.

In an embodiment, the restoration device comprises a compressed spring, one end of the compressed spring is contact with the steering base, and the other end of the compressed spring is contact with a pressure sheet fixedly connected to the fixed base.

In an embodiment, the restoration device comprises a pair of springs, the steering base has a free end located between the pair of springs, one of the springs is arranged between one side of the free end and the fixed base, and the other one of the springs is arranged between the other side of the free end and the fixed base.

In an embodiment, the fixed base has a cavity, the free end is swingably arranged in the cavity, the free end is located between the pair of springs, one of the springs is arranged between an inner wall on one side of the cavity and a surface on one side of the free end, and the other one of the springs is arranged between an inner wall on the other side of the cavity and a surface on the other side of the free end.

In an embodiment, the steering mechanism further comprises a pressure cover fixedly connected to an end portion of the rotating shaft, and the steering base is limited between the fixed base and the pressure cover.

In an embodiment, one of the steering base and the fixed base is provided with a raised part and the other one is provided with a recess, the raised part and the recess fit with each other, the raised part is swingably inserted into the recess, the recess has a pair of limit surfaces, and when the raised part contacts one of the limit surfaces, the steering base stops rotating.

In an embodiment, the rotating shaft is gradually tilted downward or upward from front to rear.

In an embodiment, the steering wheels comprises a left steering wheel and a right steering wheel;

the steering mechanism comprises a connecting rod, a left connector arranged on the left steering wheel, a right connector arranged on the right steering wheel, and a mounting base arranged on the vehicle frame;

the left connector is rotatably connected with a left end portion of the connecting rod and a left end portion of the mounting base, respectively, and the right connector is rotatably connected with a right end portion of the connecting rod and a right end portion of the mounting base, respectively, such that the connecting rod, the left connector, the mounting base, and the right connector form a four-bar linkage;

an acute angle is formed between a connecting line of a rotating joint of the left connector and the connecting rod and a rotating joint of the left connector and the mounting base and a horizontal plane, and an acute angle is formed between a connecting line of a rotating joint of the right connector and the connecting rod and a rotating joint of the right connector and the mounting base and a horizontal plane.

In an embodiment, the rotating joint of the left connector and the connecting rod is lower than the rotating joint of the left connector and the mounting base, and the rotating joint of the right connector and the connecting rod is lower than the rotating joint of the right connector and the mounting base.

In an embodiment, the wheels are arranged in the front of the vehicle frame, the left steering wheel and the right steering wheel are located in rear of the wheels, and the connecting rod is located in rear of the mounting base.

Specifically, the left connector and the right connector respectively have a connecting portion aslant arranged, the connecting portions are gradually tilted downward from front to rear, and the connecting rod and the mounting base are respectively connected to the connecting portions.

In an embodiment, the wheels are arranged in the rear of the vehicle frame, the left steering wheel and the right steering wheel are located in front of the wheels, and the connecting rod is located in front of the mounting base.

Specifically, the left connector and the right connector respectively have a connecting portion aslant arranged, the connecting portions are gradually tilted upward from front to rear, and the connecting rod and the mounting base are respectively connected to the connecting portions.

In an embodiment, the left connector is rotatably connected with the left end portion of the connecting rod via a second pivot, the left connector is rotatably connected with the left end portion of the mounting base via a third pivot, the right connector is rotatably connected with the right end portion of the connecting rod via a fourth pivot, the right connector is rotatably connected with the right end portion of the mounting base via a fifth pivot, and axis of the second pivot, the third pivot, the fourth pivot, and the fifth pivot are parallel to each other.

In an embodiment, the child swing steering vehicle further comprises a driving mechanism for driving the wheels to rotate, and the driving mechanism comprises a motor and a transmission assembly connected between the motor and the wheels.

In an embodiment, a space between the centers of the steering wheels and the wheels is 400-550 mm.

Combining with the above, the present disclosure employs the above technical solution and has the following advantages over the prior art:

For the child swing steering vehicle provided by the present disclosure, when it needs to turn during driving, the child sitting on the seat tilts the body to the left or right to apply an external force to the steering mechanism, such that the steering wheels are turned to the left or the right, to realize the steering function; when steering, the left or right auxiliary wheel contacts the ground, and cooperates with the wheels and the steering wheels to form a stable support for the vehicle body, to avoid rollover, improve stability during steering, and make it safer to use.

BRIEF DESCRIPTION OF THE DRAWINGS

For more clearly explaining the technical solutions of the present disclosure, the accompanying drawings used to describe the embodiments are simply introduced in the following. Apparently, the below described drawings merely show a part of the embodiments of the present disclosure, and those skilled in the art can obtain other drawings according to the accompanying drawings without creative work.

Figure 1:
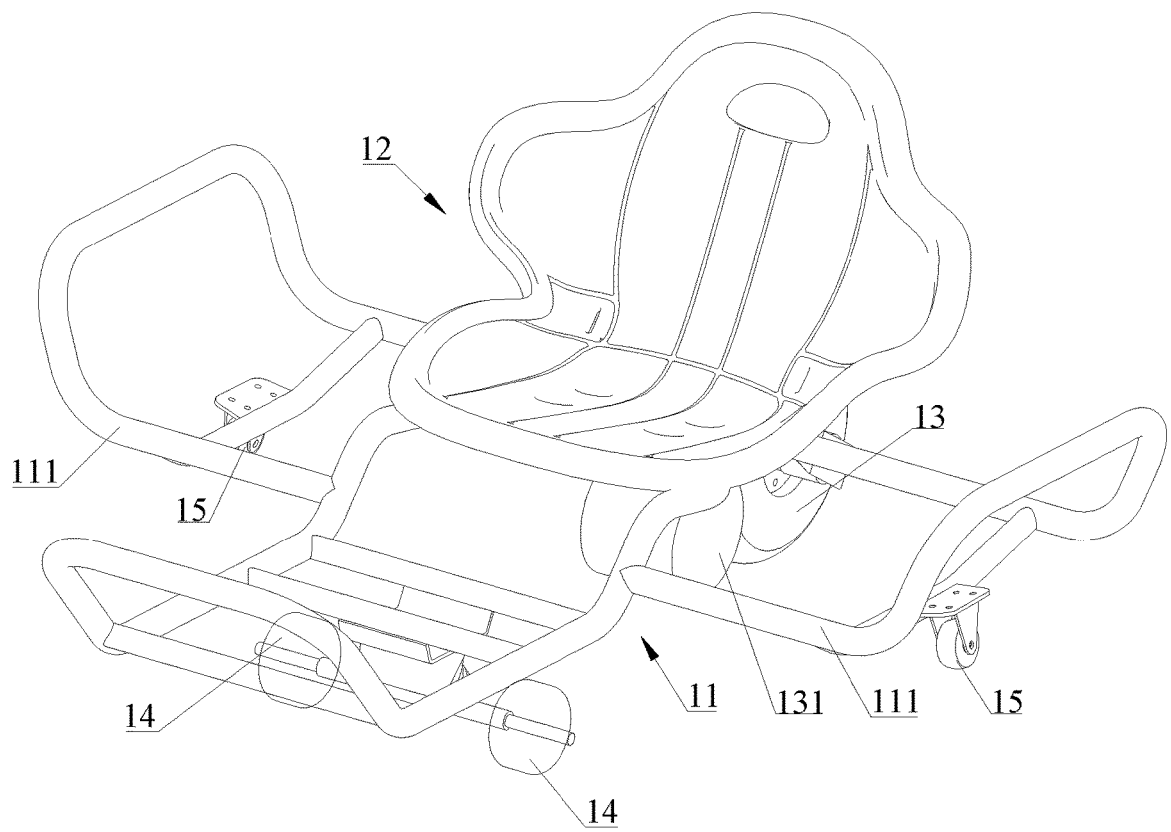
FIG. 1 is a stereogram of a child swing steering vehicle when going straight according to an embodiment of the present disclosure.

Wherein,

11—vehicle frame; 111—handle frame; 12—seat; 13—wheel; 131—motor; 132—transmission assembly; 14—steering wheel; 140—wheel shaft; 15—auxiliary wheel; 16—steering base; 160—raised part; 160a—side surface; 160b—side surface; 17—fixed base; 170—recess; 170a—limit surface; 170b—limit surface; 171—rotating shaft; 172—pressure sheet; 18—compressed spring;

21—vehicle frame; 210—frame body; 211—handle frame; 213—first pivot; 22—seat; 23—wheel; 231—motor; 232—transmission assembly; 24—steering wheel; 240—wheel shaft; 25—auxiliary wheel; 26—steering base; 260—free end; 27—fixed base; 270—cavity; 271—rotating shaft; 272—pressure sheet; 28—compressed spring;

31—vehicle frame; 311—handle frame; 32—seat; 33—wheel; 331—motor; 332—chain; 333—gear ring; 341—left steering wheel; 342—right steering wheel; 35—auxiliary wheel; 36—connecting rod; 37—left connector; 370—connecting portion; 38—right connector; 380—connecting portion; 39—mounting base; a1—second pivot; a2—third pivot; a3—fourth pivot; a4—fifth pivot.

DETAILED DESCRIPTION OF EXEMPLARY EMBODIMENTS

In the following, the preferable embodiments of the present disclosure are explained in detail combining with the accompanying drawings so that the advantages and features of the present disclosure can be easily understood by the skilled persons in the art. Nouns of locality such as front, rear, left, right referred in the present disclosure, are defined in a straight going state of the child swing steering vehicle, taking the traveling direction as the front.

FIGS. 1-6 show a child swing steering vehicle according to an embodiment of the present disclosure, and FIGS. 7-14 show several optional variations of the child swing steering vehicle according to an embodiment of the present disclosure.

Referring to FIGS. 1-6, the child swing steering vehicle comprises a vehicle frame 11, a seat 12, wheels 13, steering wheels 14, a steering mechanism, and auxiliary wheels 15. The seat 12 is arranged on the vehicle frame 11 for a child to ride. The wheels 13 and the steering wheel 14 are spaced at the bottom of the vehicle frame 11 in a front-rear direction, wherein the wheels 13 may be arranged at the front of the vehicle frame 11 as front wheels and the steering wheels 14 may be arranged at the rear of the vehicle frame 11 as rear wheels, or the steering wheels 14 may be arranged at the front of the vehicle frame 11 as front wheels and the wheels 13 may be arranged at the rear of the vehicle frame 11 as rear wheels. The steering wheels 14 are specifically connected to the vehicle frame 11 via the steering mechanism, and the steering mechanism is used to turn the steering wheels 14 left or right as the child's body is tilted to the left or right. The left and right sides of the vehicle frame 11 are respectively provided with at least one auxiliary wheel 15 which contacts the ground when the child swing steering vehicle is turning.

In the current embodiment, a sum of the number of the wheels 13 and the steering wheels 14 is greater than or equal to three, and the bottom of the wheels 13 and the bottom of the steering wheels 14 are both located in a same plane (such as the ground), that is to say, the wheels 13 and the steering wheels 14 can form a stable support to the child swing steering vehicle when they down to the ground. The auxiliary wheels 15 are located on the outside the wheels 13 and the steering wheels 14, that is, the auxiliary wheel 15 on the left side of the vehicle frame 11 is located on the left side of the wheels 13 and the steering wheels 14, and the auxiliary wheel 15 on the right side of the vehicle frame 11 is located on the right side of the wheels 13 and the steering wheels 14; at least when the child swing steering vehicle is turning, the bottom of the auxiliary 15 on the left or right, the bottom of the wheels 13, and the bottom of the steering wheels 14 are located in the same plane, such that when turning, the bottom of the auxiliary 15 on the left or right also contacts the ground, and form a stable support to the child swing steering vehicle together with the wheels 13 and the steering wheels 14, avoiding rollover. Specifically in the present embodiment, the number of the wheels 13 is one and the wheels 13 is arranged at the rear portion of the vehicle frame 11, the number of the steering wheels 14 is two and the steering wheels 14 are arranged at the rear portion of the vehicle frame 11, and the left and right sides of the vehicle frame 1 are respectively provided with one auxiliary wheel 15; when the child swing steering vehicle goes straight, the wheel 13 and the two steering wheels 14 downs the ground, which can form a three-point stable support to the vehicle body, at this moment, the bottom of the auxiliary wheels 15 is higher than the plane in which the bottom of the wheel 13 and the bottom of the steering wheels 14 are located, as shown in FIGS. 1 and 2; when the child turns the child swing steering vehicle by tilting the body to the left or right, the vehicle frame 11 and the seat 12 are tilted to the left or right, the auxiliary wheel 15 on the left or right contacts the ground, and forms a support to the vehicle body together with the wheel 13 and the steering wheels 14, as shown in the schematic diagram of the left turn in FIG. 6.

Figure 2:
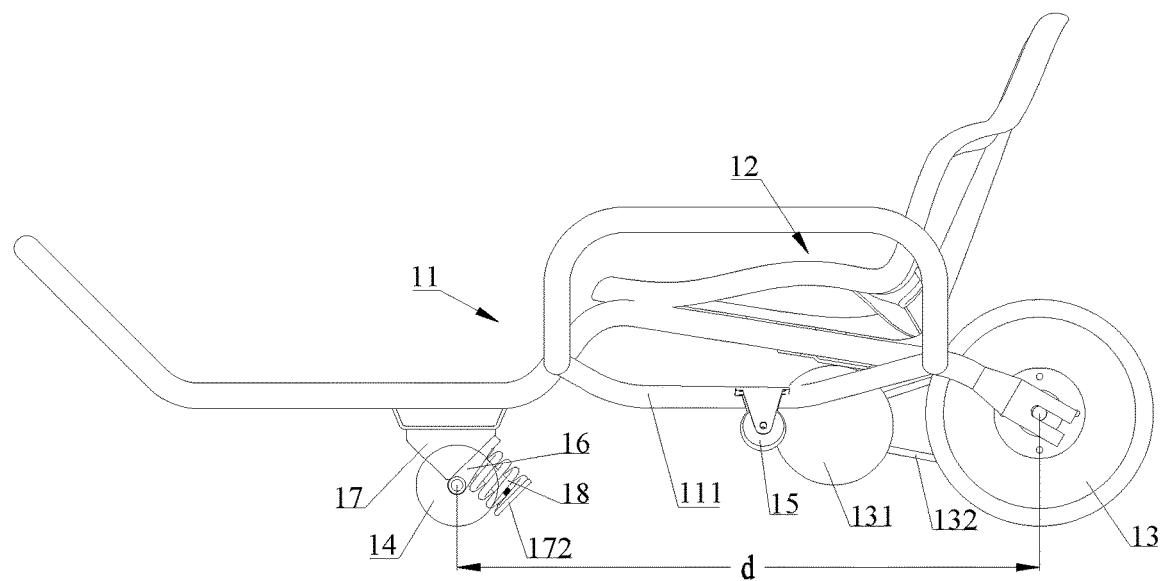
FIG. 2 is a side view of the child swing steering vehicle shown in FIG. 1.

It also should be noted that, in the child swing steering vehicle, a space d between the centers of the steering wheels 14 and the wheel 13 is 400-550 mm, as shown in FIG. 2. In the present embodiment, the center of the steering wheels 14 specifically refers to the midpoint of a connecting line of the geometric centers of the steering wheels 14 on the two sides, and the center of the wheel 13 refers to the geometric center of the wheel 13. While in other embodiments, if there are several wheels, the center of the wheels refers to the midpoint of a connecting line of the geometric centers of the wheels. The space d between the centers of the steering wheels 14 and the wheel 13 is set to 400-550 mm, such that the wheel track of the steering wheels 14 and the wheel 13 is small, the radius of turning circle is reduced accordingly, the excitement of turning during fast speeds is increased, and the enjoyment of driving is improved. When the space d between the front wheel and the rear wheels is 400 mm, it needs to adopt a driving wheel with a motor as the wheel, in the current embodiment, a drive mechanism is used, and the space d between the front wheel and the rear wheels is about 500 mm.

Figure 3:
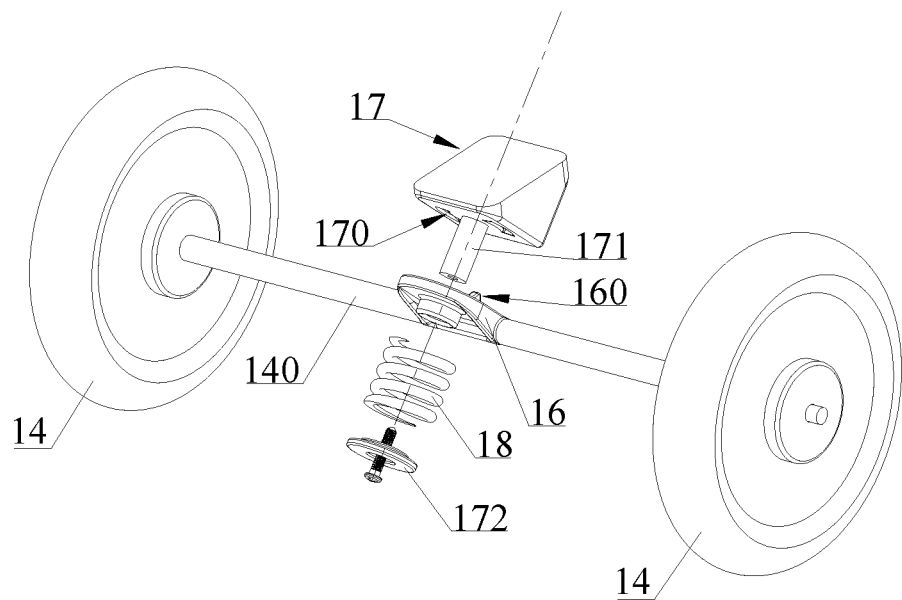
FIG. 3 is a schematic diagram of the steering wheels and steering mechanism of the child swing steering vehicle shown in FIG. 1.
Figure 4:
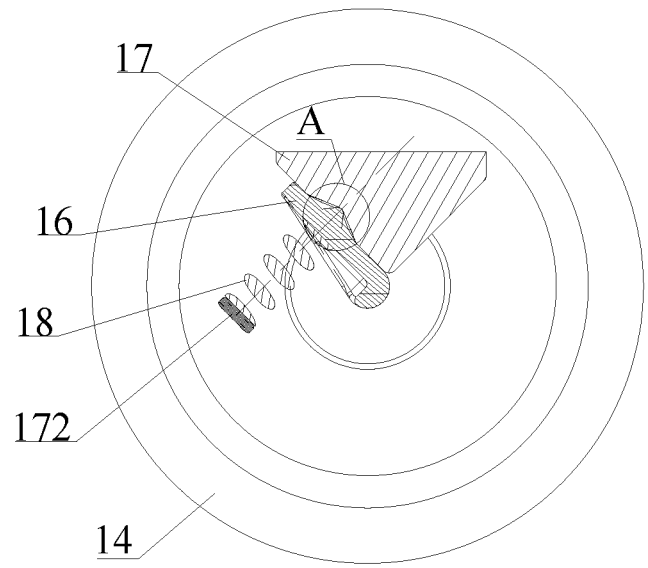
FIG. 4 is an axial sectional view of the steering mechanism of the child swing steering vehicle shown in FIG. 1.
Figure 5:
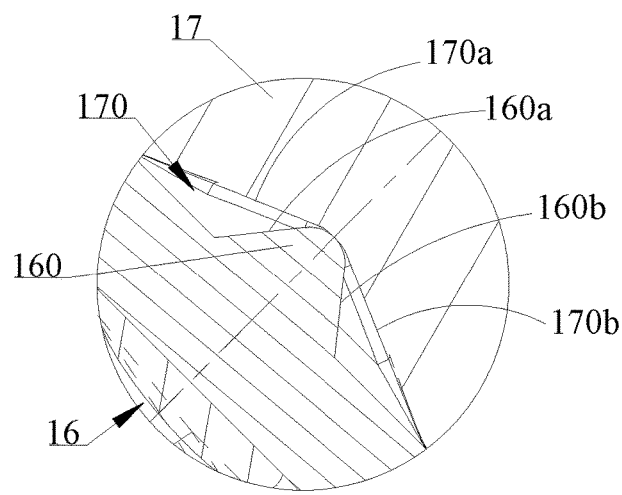
FIG. 5 is a partial enlarged view of Part A in FIG. 4.
Figure 6:
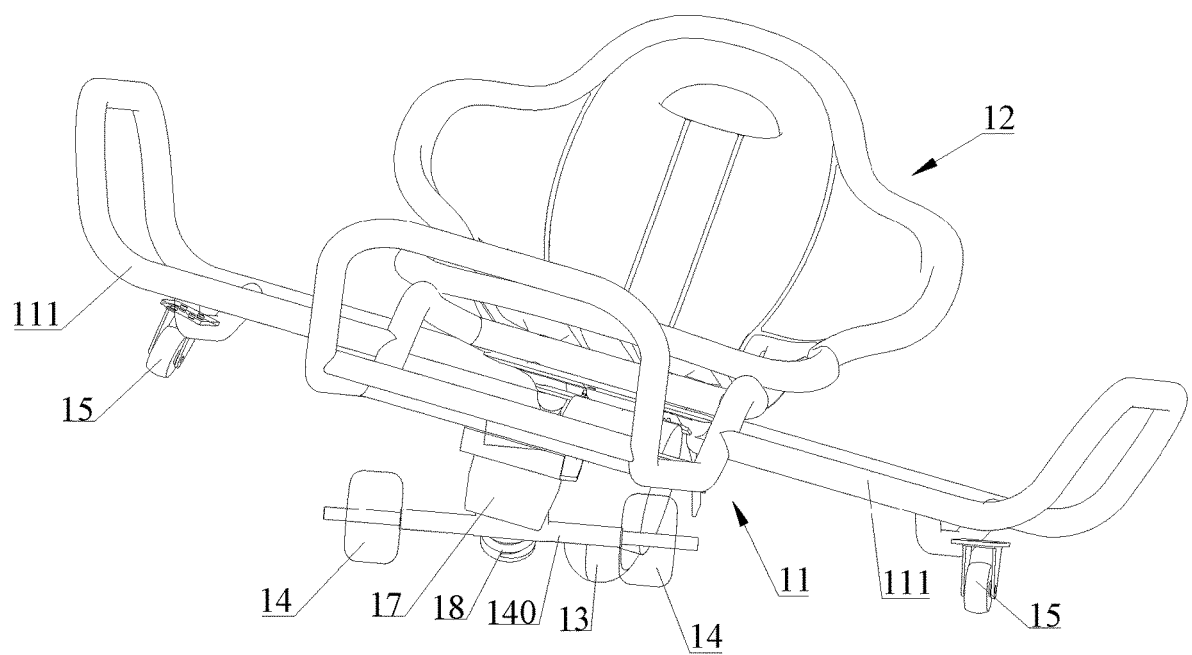
FIG. 6 is a schematic diagram of the child swing steering vehicle shown in FIG. 1 when turning.

The steering mechanism takes many forms. FIGS. 3-5 show a steering mechanism used by the present embodiment, the steering wheels 14 are connected via a wheel shaft 140, the steering mechanism comprises a steering base 16 fixedly connected to the wheel shaft 140, and a fixed base 17 fixedly connected with the vehicle frame 11, the steering base 16 is rotatably connected with the fixed base 17 via a rotating shaft 171 fixed on the fixed base 17, the rotating shaft 171 extends along the front-rear direction or the up-down direction, and an acute angle is formed between a shaft axis of the rotating shaft 171 and a horizontal plane, as shown in FIG. 2, specifically, the rotating shaft 171 are gradually tilted downward from front to rear. When the child's body is tilted to the left or right, under the action of the rotating shaft 171, the steering base 16 is rotated relative to the fixed base 17, the wheel shaft 140 is rotated therewith, such that the steering wheels 14 turn.

The steering mechanism further comprises a restoration device for restoring the child swing steering vehicle from turning to straight going, and the restoration device comprises a compressed spring 18. A pressure sheet 172 is fixedly arranged on the fixed base 17, preferably, the pressure sheet 172 is fixedly connected to a lower end portion of the rotating shaft 171, the steering base 16 is located between the pressure sheet 172 and the fixed base 17, and an end portion of the compressed spring 18 is connected with the steering base 16 and the other end portion thereof is connected with the pressure sheet 172, so as to be compressed between the pressure sheet 172 and the steering base 16. When the steering base 16 turns relative to the fixed base 17, the compressed spring 18 is compressed; after the turning finishes, the steering base 16 turns to an opposite direction under the action of the elastic force of the compressed spring 18, and gradually restores to the straight going state of the child swing steering vehicle.

The steering base 16 is provided with a raised part 160 and the fixed base 17 is provided with a recess 170, and the raised part 160 and the recess 170 fit with each other, for limiting the rotation of the steering base 16.

The raised part 160 is swingably inserted in the recess 170, the recess 170 has a pair of limit surfaces 170a and 170b, the raided part 160 has a pair of side surface 160a and 160b respectively located at the opposite sides thereof and fit with the pair of limit surfaces 170a and 170b, wherein one limit surface 170a and one side surface 160a are opposite, and the other limit surface 170b and the other side surface 160b are opposite, an angle between the pair of limit surfaces 170a and 170b is greater than an angle between the pair of side surface 160a and 160b, so as to allow the raised part 160 swing between the pair of limit surfaces 170a and 170b, until one side surface 160a or 160b of the raised part 160 contacts the corresponding limit surface 170a or 170b, and the steering base 16 stops rotating. Preferably, the pair of limit surfaces 170a and 170b are symmetrically arranged, and the pair of side surface 160a and 160b are symmetrically arranged.

The child swing steering vehicle is a child electrical vehicle, which is driven by a motor. As shown in FIG. 2, the child swing steering vehicle further comprises a driving mechanism for driving the wheel 13 to rotate, and the driving mechanism comprises a motor 131 and a transmission assembly 132 connected between the motor 131 and the wheel 13. The transmission assembly 132 comprises a chain, a belt, a gear, and the like. The wheel may be the front wheel of the child swing steering vehicle, or may be the rear wheel, correspondingly, the child swing steering vehicle may adopt a front-wheel drive mode, or may adopt a rear-wheel drive mode as shown in FIGS. 1-6.

The vehicle frame 11 specifically comprises a frame body and two handle frames 111 respectively extending from the left and right sides of the frame body, and the auxiliary wheels 15 are arranged at the bottom of the handle frames 111. In the embodiment shown in FIGS. 1-6, the auxiliary wheels 15 specifically uses directional wheels.

Figure 7:
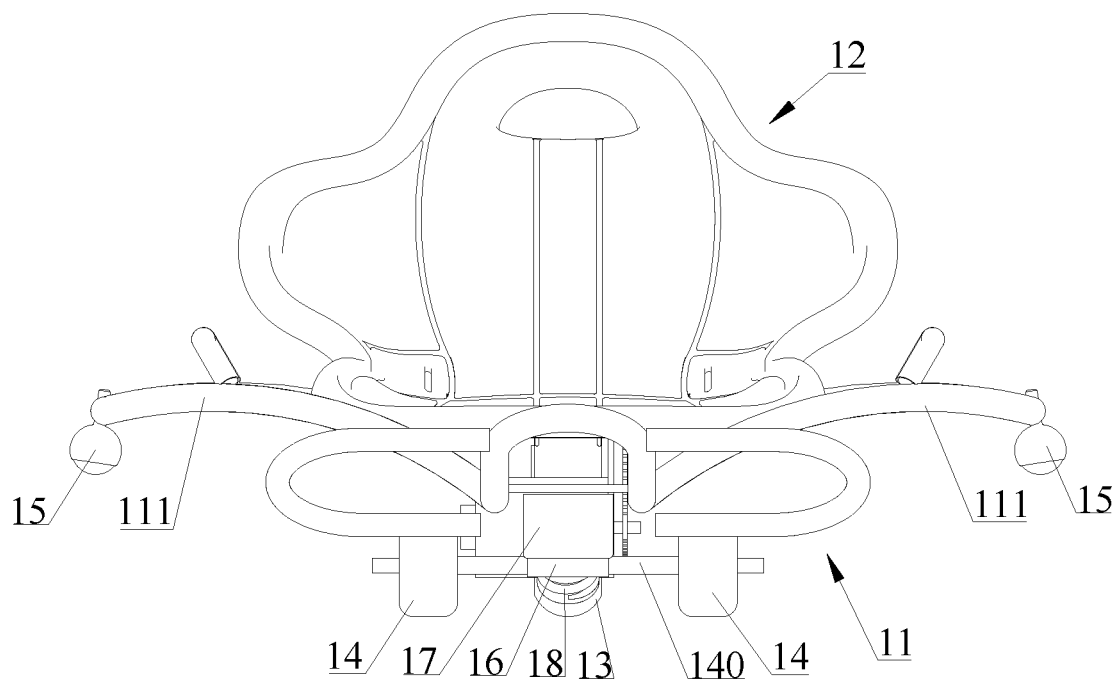
FIGS. 7 and 8 are schematic diagrams of a second child swing steering vehicle when going straight and turning according to an embodiment of the present disclosure.
Figure 8:
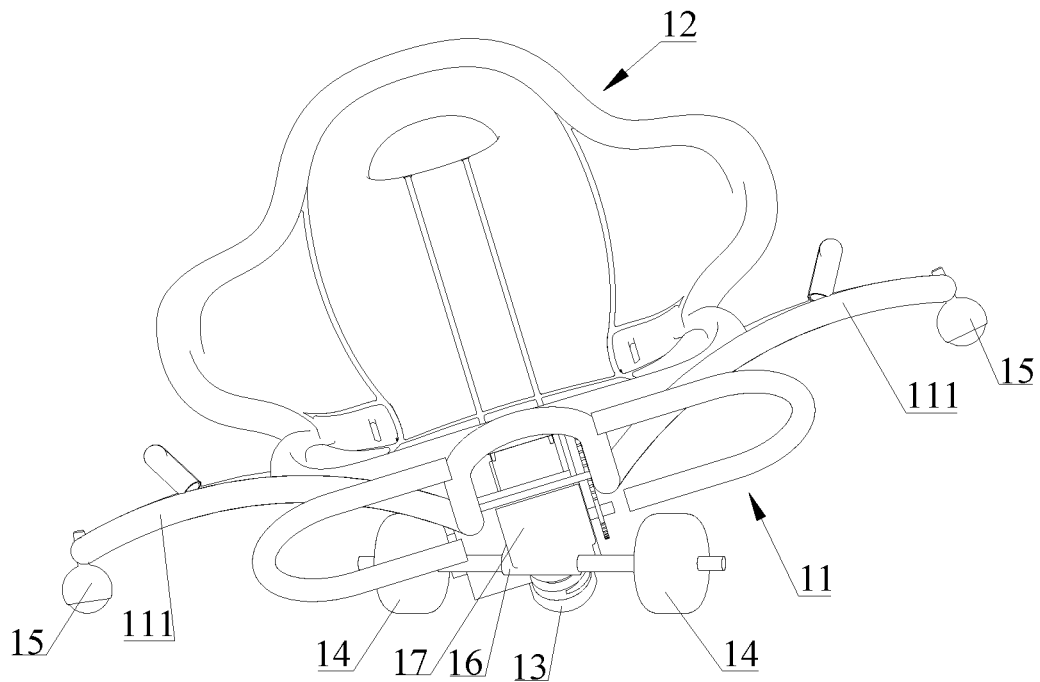

FIGS. 7 and 8 show another child swing steering vehicle of the present embodiment, the auxiliary wheels 15 are ball wheels; the wheel 13 is arranged at the rear portion of the vehicle frame 11 as the rear wheel, and the rear wheel is driven by a motor, and a rear-wheel drive mode is used.

Figure 9:
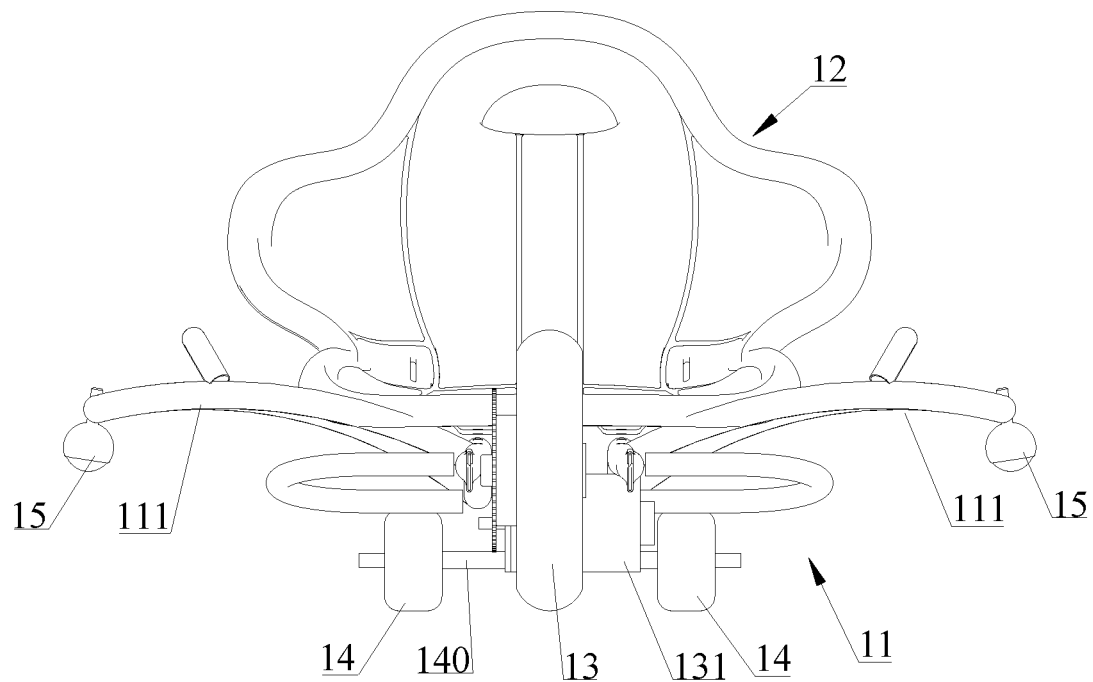
FIGS. 9 and 10 are schematic diagrams of a third child swing steering vehicle when going straight and turning according to an embodiment of the present disclosure.
Figure 10:
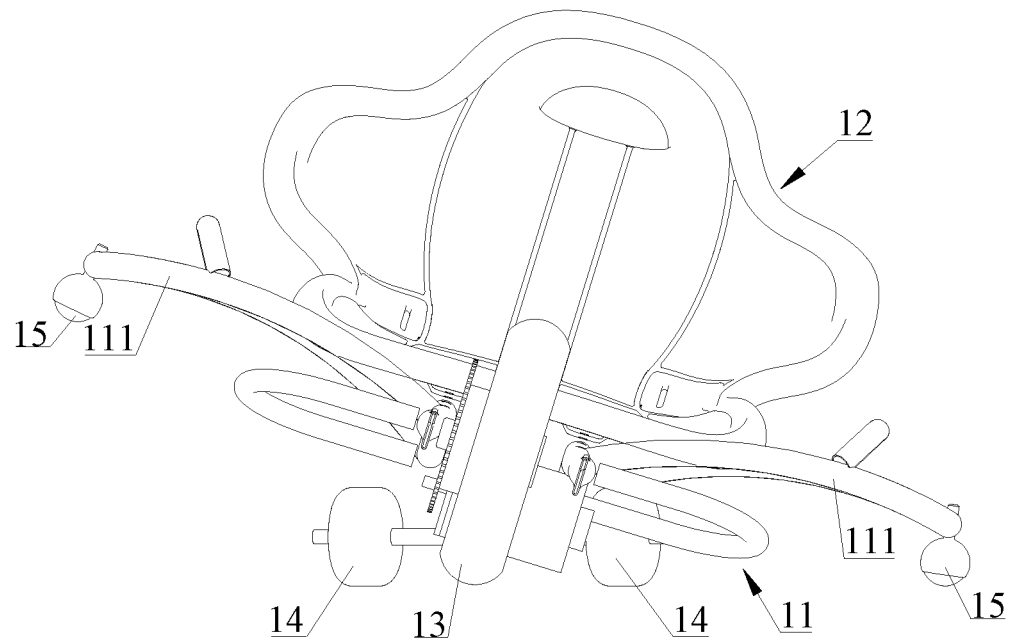

FIGS. 9 and 10 show a third child swing steering vehicle of the present embodiment, the auxiliary wheels 15 are ball wheels; the wheel 13 is arranged at the front portion of the vehicle frame 11 as the front wheel, and the front wheel is driven by a motor 131, and a front-wheel drive mode is used.

Figure 11:
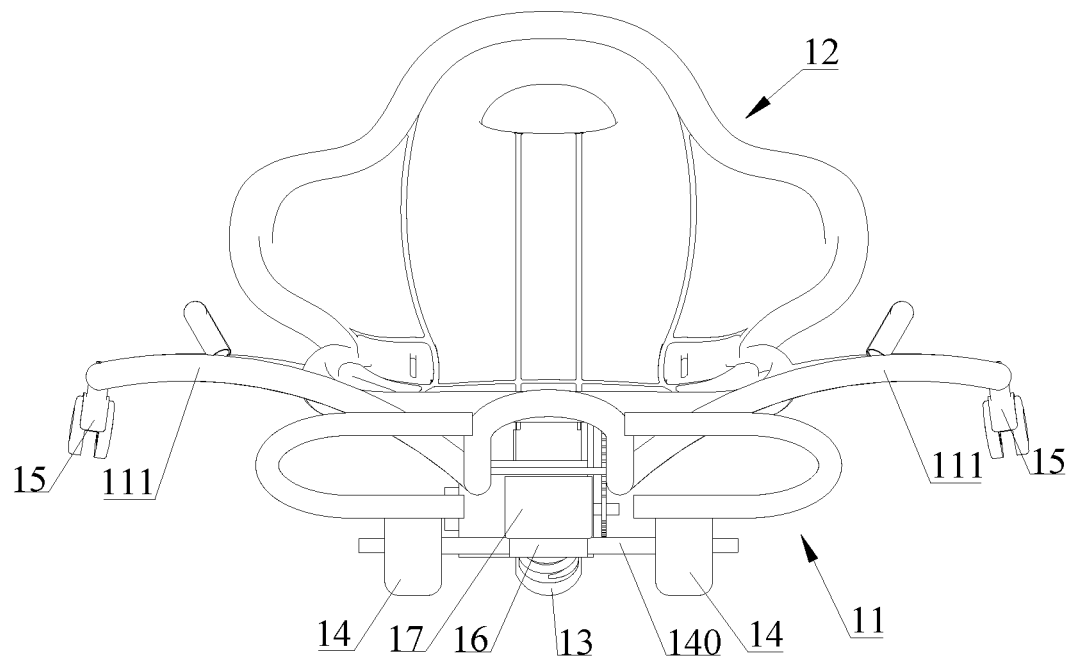
FIGS. 11 and 12 are schematic diagrams of a fourth child swing steering vehicle when going straight and turning according to an embodiment of the present disclosure.
Figure 12:
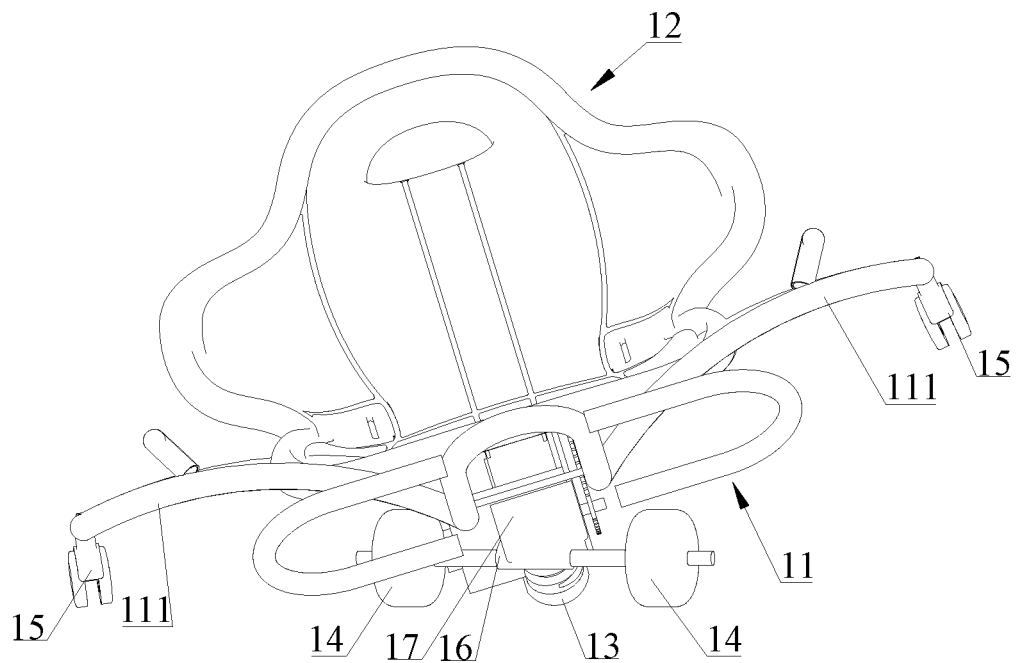

FIGS. 11 and 12 show a fourth child swing steering vehicle of the present embodiment, the auxiliary wheels 15 are off-centered omni-directional wheels; the wheel 13 is arranged at the rear portion of the vehicle frame 11 as the rear wheel, and the rear wheel is driven by a motor, and a rear-wheel drive mode is used.

Figure 13:
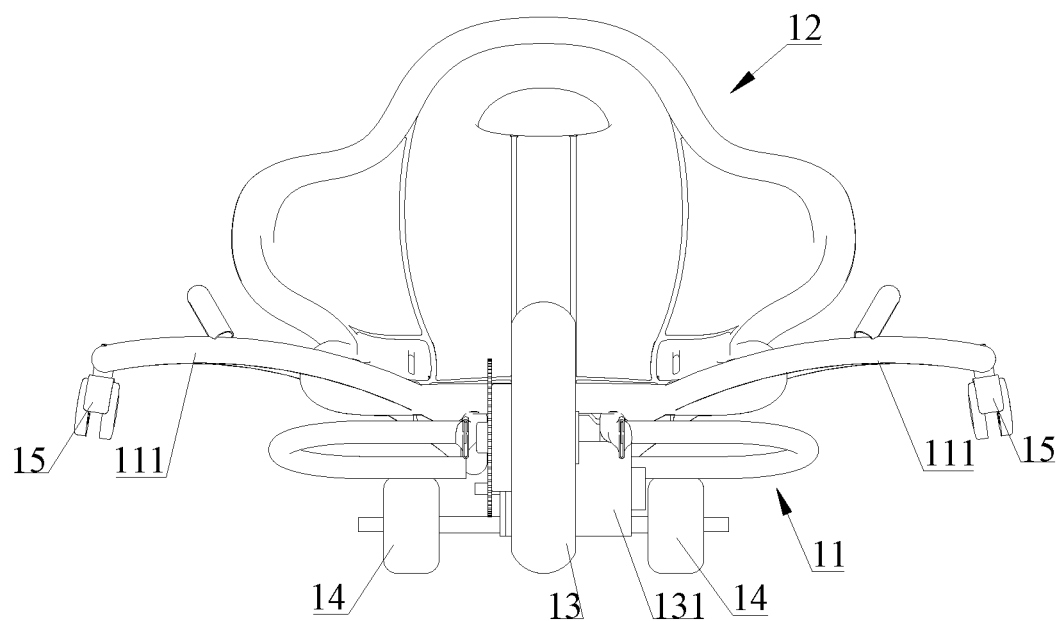
FIGS. 13 and 14 are schematic diagrams of a fifth child swing steering vehicle when going straight and turning according to an embodiment of the present disclosure.
Figure 14:
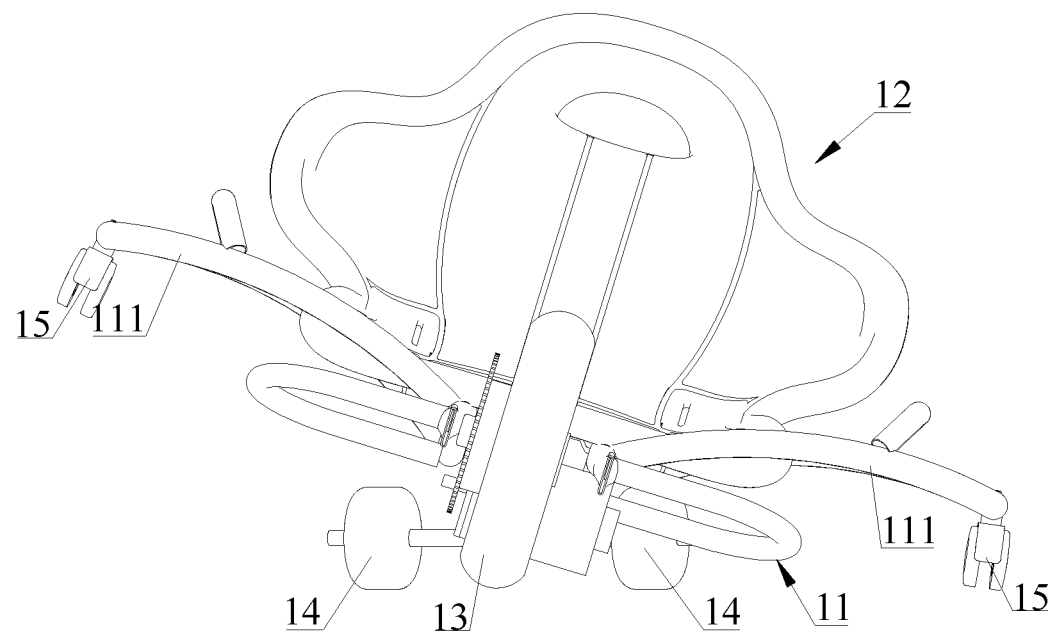
Figure 15:
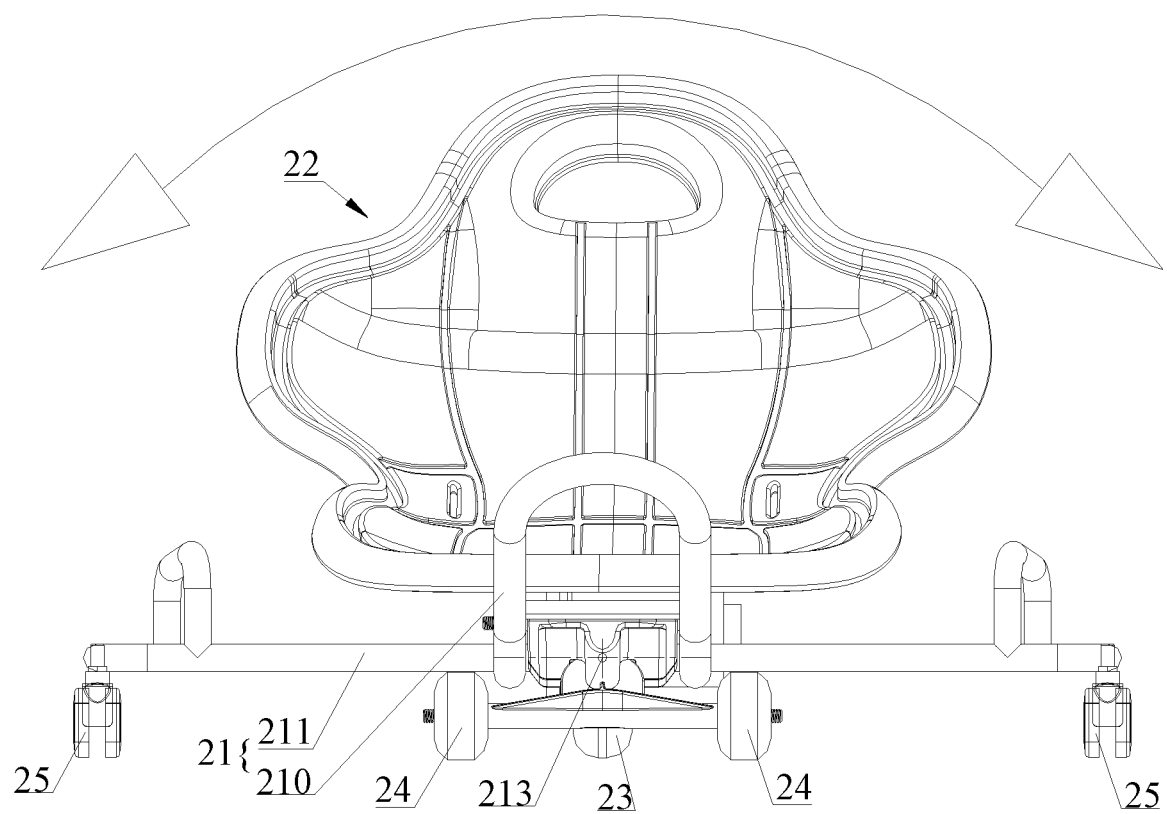
FIG. 15 is a front view of a child swing steering vehicle when going straight according to another embodiment of the present disclosure.

FIGS. 13 and 14 show a fifth child swing steering vehicle of the present embodiment, the auxiliary wheels 15 are off-centered omni-directional wheels; the wheel 13 is arranged at the front portion of the vehicle frame 11 as the front wheel, and the front wheel is driven by a motor 131, and a front-wheel drive mode is used.

For the child swing steering vehicle provided by the present embodiment, when it needs to turn during driving, the child sitting on the seat 12 tilts the body to the left or right, applies an external force to the steering mechanism, the steering base 16 is rotated relative to the fixed base 17, the steering wheels 14 are turned to the left or the right, to realize the steering function; when steering, with the left or right tilt of the vehicle body, the left or right auxiliary wheel 15 contacts the ground to form a stable support to the vehicle body cooperates with the wheel 13 and the steering wheels 14, to avoid rollover, such that improve stability during steering, and make it safer to use.

Figure 16:
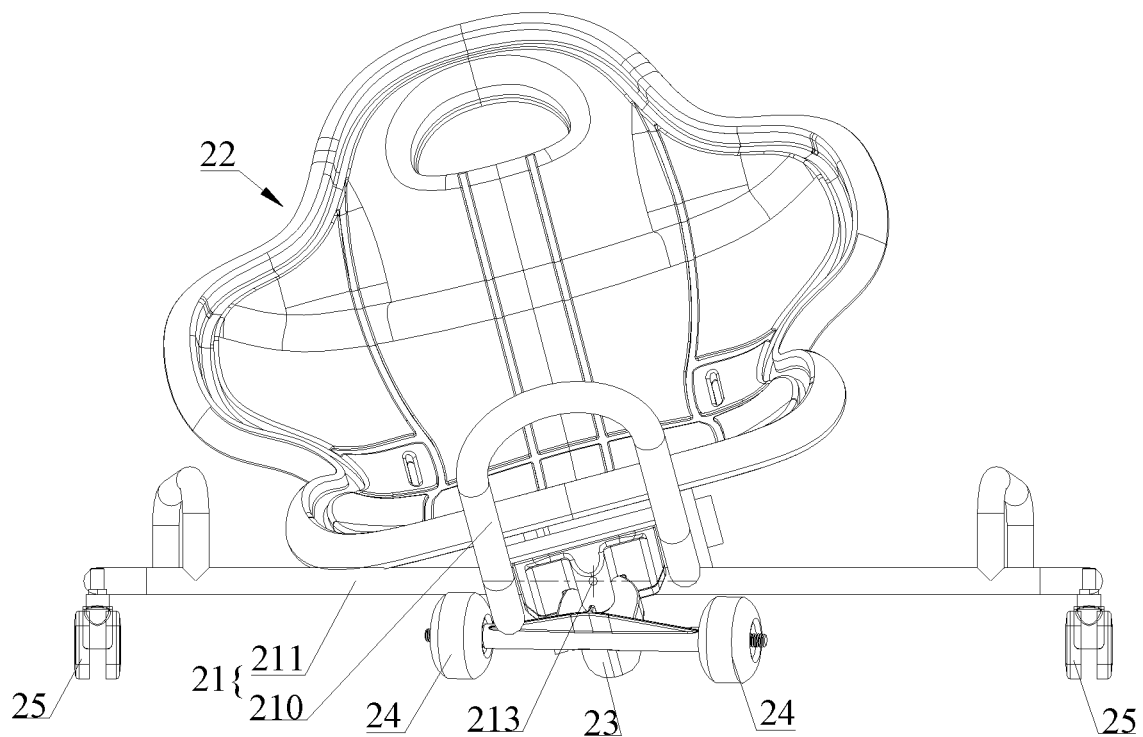
FIG. 16 is a front view of the child swing steering vehicle shown in FIG. 15 when turning right.
Figure 17:
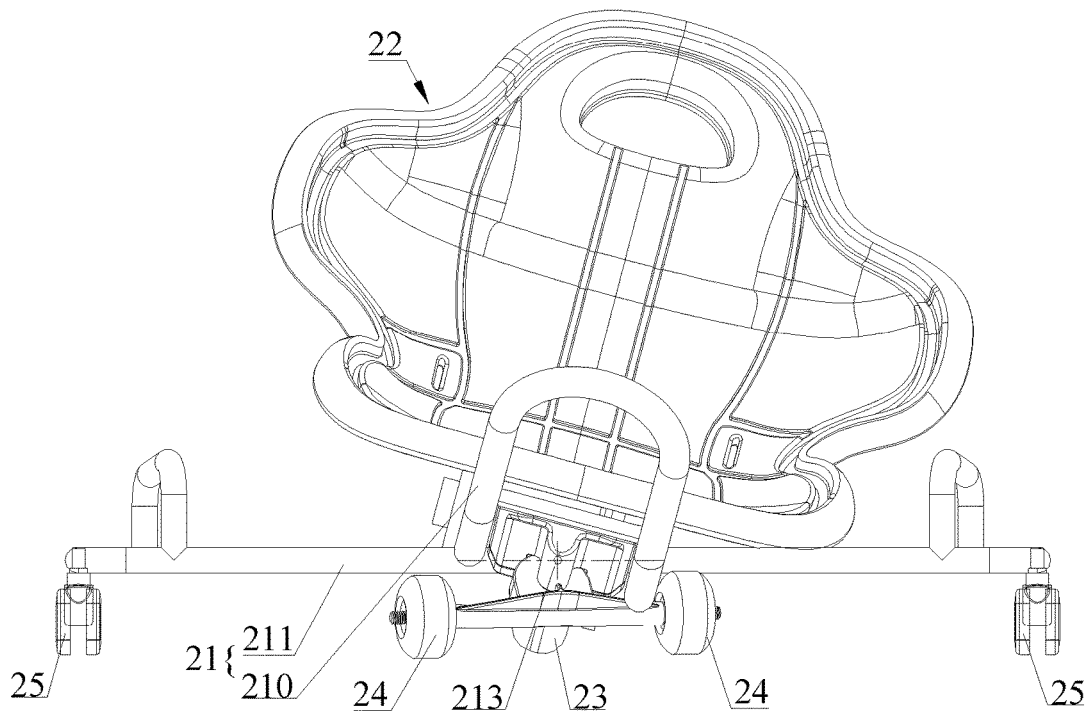
FIG. 17 is a front view of the child swing steering vehicle shown in FIG. 15 when turning left.

FIGS. 15-21 show another embodiment of the present disclosure. Referring to FIGS. 15-21, the child swing steering vehicle provided by the embodiment comprises a vehicle frame 21, a seat 22, wheels 23, steering wheels 24, a steering mechanism, and auxiliary wheels 25. The vehicle frame 21 mainly consists of a frame body 210 and handle frames 211, and the frame body 210 is rotatably connected to the handle frames 211 and capable of turning left and right. Specifically, the frame body 210 is rotatably connected to the handle frames 211 via a first pivot 213, and the first pivot 213 extends along a front-rear direction and is parallel to a horizontal plane, such that the frame body 210 is able to swing to the left (as shown in FIG. 16) or right (as shown in FIG. 17) around the first pivot 213 along a direction indicating by an arrow in FIG. 15. The seat 22 is arranged on the frame body 210 for a child to ride. The wheels 23 and the steering wheel 24 are spaced in the front-rear direction. The steering mechanism is used to turn the steering wheels 24 left or right as the child's body is tilted to the left or right. The left and right sides of the handle frames 211 are respectively provided with at least one auxiliary wheel 25, and in the embodiment shown in FIGS. 15-21, off-centered omni-directional wheels are used as the auxiliary wheels 25.

The handle frame 211 is located between the steering wheels 24 and the wheels 23 arranged front and rear, the left and right side portions of the handle frame 211 extends outward with respect to the frame body 210, such that the auxiliary wheels 25 are located on the outside of the wheels 23 and the steering wheels 24, that is, the auxiliary wheel 25 on the left side portion of the handle frame 211 is located on the left side of the wheels 23 and the steering wheels 24, and the auxiliary wheel 25 on the right side portion of the handle frame 211 is located on the right side of the wheels 23 and the steering wheels 24, whether the child swing steering vehicle goes straight or turns, the auxiliary wheels 25 on both sides touch the ground all the time. In the embodiment, the number of the wheels 23 is one and the wheel 23 is arranged at the bottom of the frame body 210, the steering wheels 24 are connected to the bottom of the frame body 210 via the steering mechanism, and the number of the steering wheels 24 and the auxiliary wheels 25 are respectively two. When the child swing steering vehicle goes straight, the bottom of the wheel 23, the bottom of the two steering wheels 24, and the bottom of the two auxiliary wheels 25 are both located in a same plane (such as the ground), that is to say, the wheel 23, the steering wheels 24 and the auxiliary wheels 25 form a stable support to the child swing steering vehicle when they are down to the ground. When the child swing steering vehicle is turning, the wheels 23, the two steering wheel 24 on at least one side, and the two auxiliary wheels 25 are still located in the above-mentioned plane, and the landing of the wheels 23, the steering wheel 24 on the at least one side and the two auxiliary wheels 25 can still form a stable support to the child swing steering vehicle. That is to say, regardless of straight going or turning, the auxiliary wheels 25 on the both sides and the wheel 23 touch the ground all the time, thus form a stable triangle, and form a stable support to the child swing steering vehicle, avoiding rollover and enabling the whole vehicle run stably.

Figure 19:
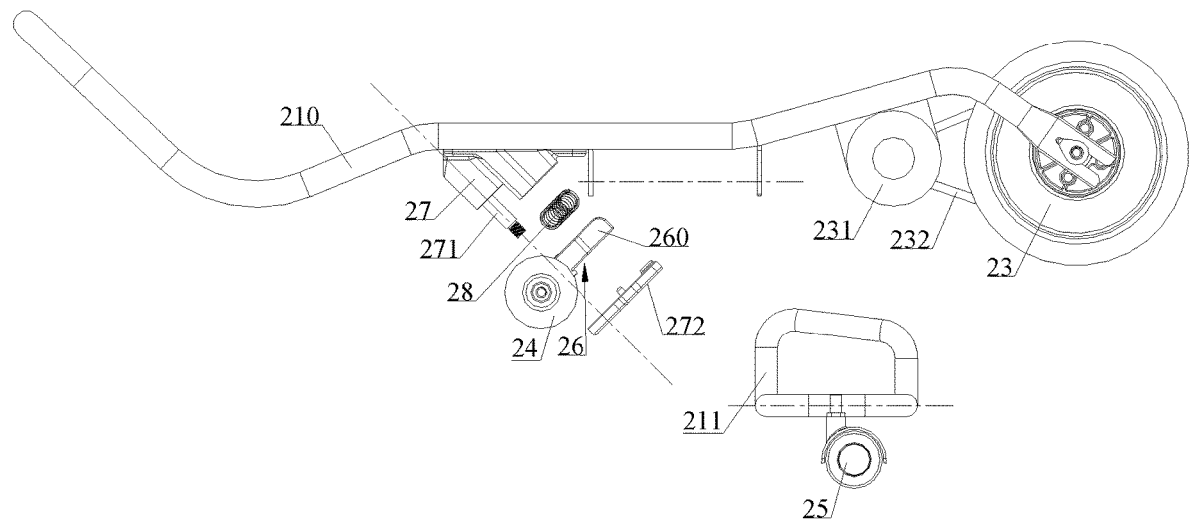
FIG. 19 is one exploded view of the child swing steering vehicle shown in FIG. 15 from a perspective, wherein the seat is not shown.
Figure 20:
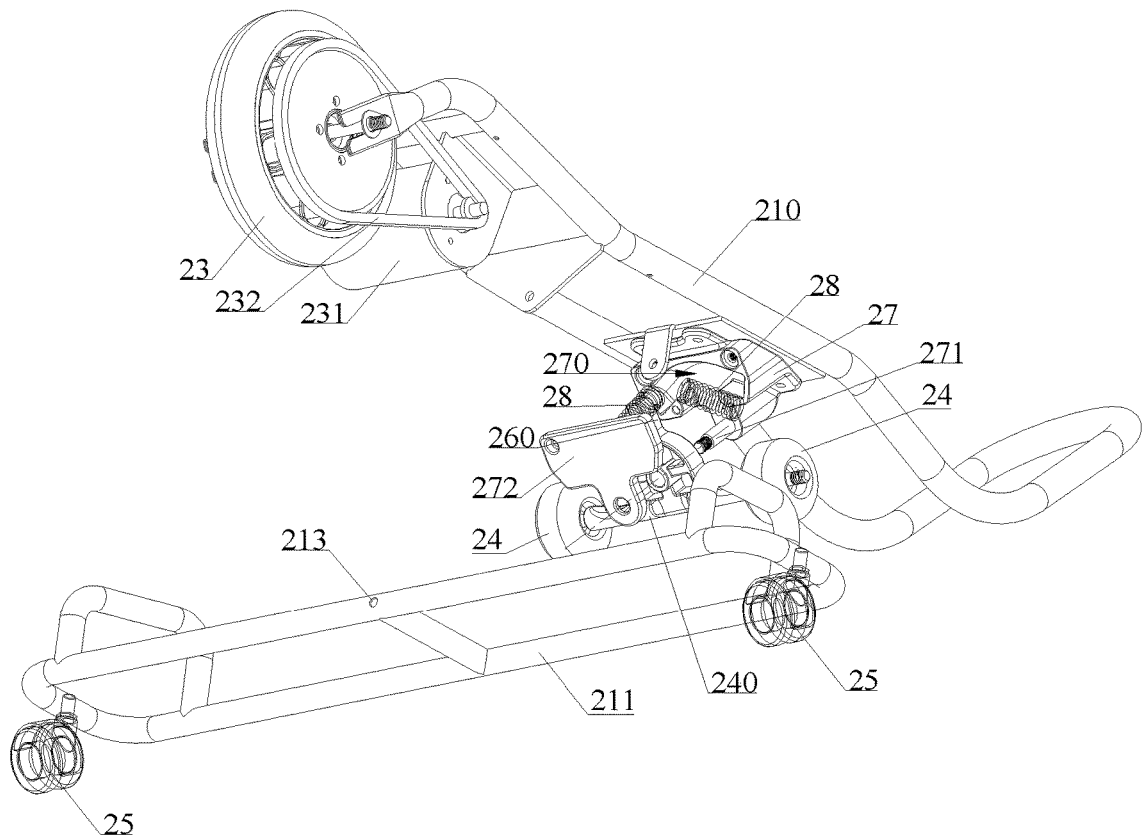
FIG. 20 is another exploded view of the child swing steering vehicle shown in FIG. 15, wherein the seat is not shown.
Figure 21:
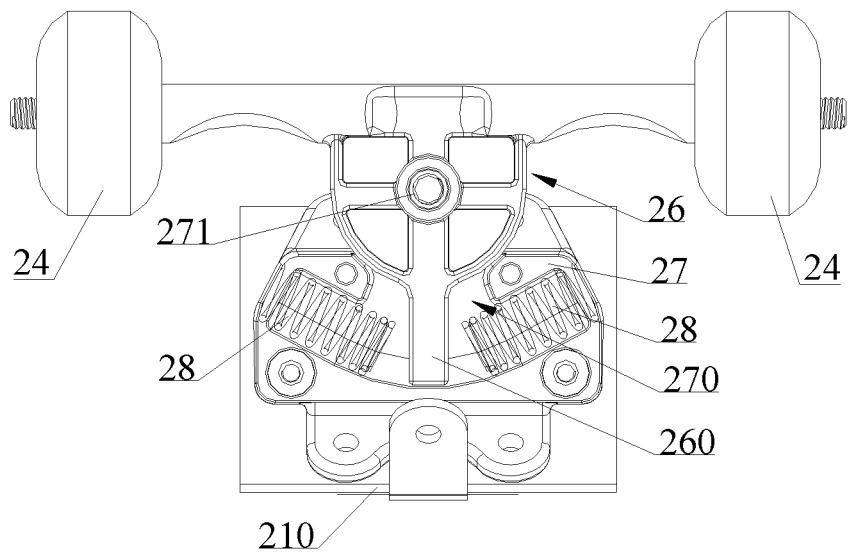
FIG. 21 is a rear view of the steering wheels and steering mechanism of the child swing steering vehicle shown in FIG. 15, wherein the pressure cover is not shown.

Referring to FIGS. 19-21, the steering mechanism of the current embodiment comprises a steering base 26, a fixed base 27 fixedly connected to the vehicle frame 21, the steering wheels 24 on the two sides are connected via a wheel shaft 240, and the steering base 26 are fixedly connected to the rotating shaft.

The steering base 26 is rotatably connected with the fixed base 27 via a rotating shaft 271 fixed on the fixed base 27, the rotating shaft 271 extends along the front-rear direction or the up-down direction, and an acute angle is formed between a shaft axis of the rotating shaft 271 and a horizontal plane, as shown in FIG. 19, specifically, the rotating shaft 271 are gradually tilted downward from front to rear. When the child's body is tilted to the left or right, under the action of the rotating shaft 271, the steering base 26 is rotated relative to the fixed base 27, the wheel shaft 240 is rotated therewith, such that the steering wheels 24 turn. The steering mechanism further comprises a pressure cover 272 fixedly connected to an end portion of the rotating shaft 271, and the steering base 26 is limited between the fixed base 27 and the pressure cover 272.

The steering mechanism further comprises a restoration device for restoring the child swing steering vehicle from turning to straight going, and the restoration device comprises a pair of springs, and the springs in the current embodiment are compressed springs 28. The fixed base 27 has a cavity 270, the steering base 26 has a free end 260 extending outward, and the free end 260 is swingably arranged in the cavity 270. The free end is located between the above-mentioned pair of springs 28, and the compressed springs 28 are arranged between the free end 260 and the inner wall of the cavity 270. Specifically, corresponding to FIG. 7, the compressed spring 28 on the left side is arranged between the inner wall on the left side of the cavity 270 and the surface on the left side of the free end 260, and the compressed spring 28 on the right side is arranged between the inner wall on the right side of the cavity 270 and the surface on the right side of the free end 260. When the steering base 26 is rotated relative to the fixed base 27, the compressed spring 28 on one side is compressed; after the turning finishes, the steering base 26 turns to an opposite direction under the action of the elastic force of the compressed spring 28, and gradually restores to the straight going state of the child swing steering vehicle.

The steering mechanism can restore the child swing steering vehicle to the straight going state by the compressed springs 28 on the two sides, and meanwhile can limit the steering angle, and when compared with the steering mechanism in the prior art, it has the advantages such as simple structure.

Figure 18:
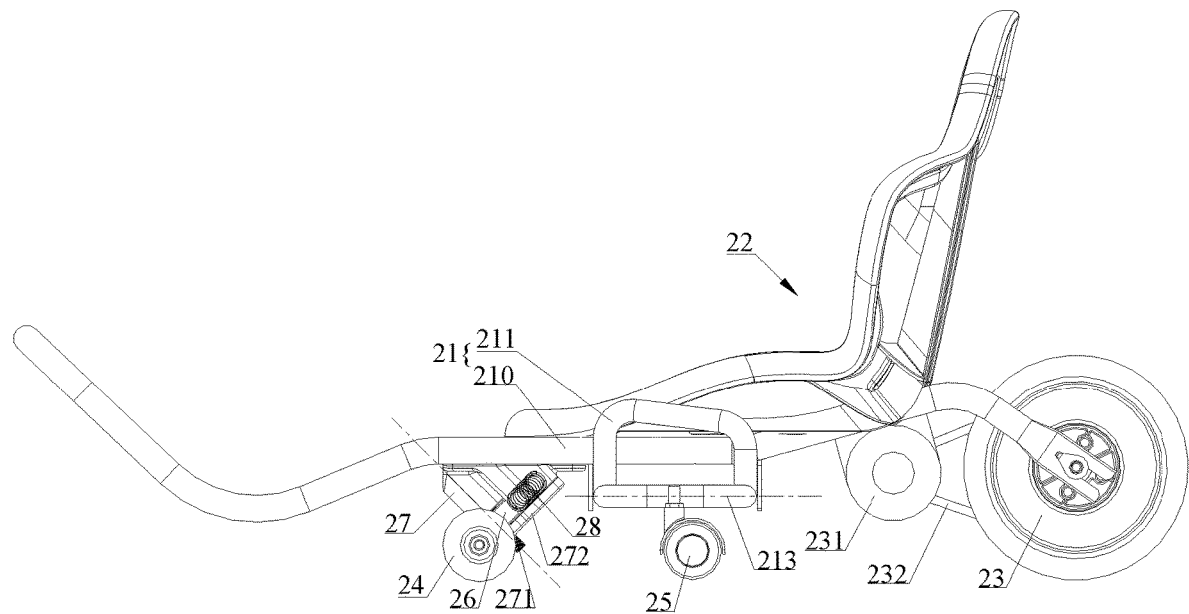
FIG. 18 is a side view of the child swing steering vehicle shown in FIG. 15.

The child swing steering vehicle is specifically a child electrical vehicle, which is driven by a motor. As shown in FIGS. 18-20, the child swing steering vehicle further comprises a driving mechanism for driving the wheel 23 to rotate, and the driving mechanism comprises a motor 231 and a transmission assembly 232 connected between the motor 231 and the wheel 23. The wheel 23 may be the front wheel of the child swing steering vehicle, or may be the rear wheel, correspondingly, the child electrical vehicle may adopt a front-wheel drive mode as shown in FIGS. 15-20, or may adopt a rear-wheel drive mode.

For the child swing steering vehicle provided by the embodiment, the realization of the swing steering is by the connection between the handle frame 211 and the first pivot 213 of the frame body 210, so as to taking the first pivot 213 as a rotating point, which may achieve the side-to-side swing of the frame body 210 with respect to the horizontal plane; and by the twist of the rotating shaft 271 of the steering mechanism, the steering during driving is realized. When it needs to turn during driving, the child sitting on the seat 22 tilts the body to the left or right, applies an external force to the steering mechanism, the steering base 26 is rotated relative to the fixed base 27, the steering wheels 24 are turned to the left or the right, to realize the steering function; after the turning finishes, the reset force of the compressed springs 28 drives the steering base 26 to restore, so as to restore the child swing steering vehicle to the straight going state; during straight going and turning, the auxiliary wheels 25 on the two sides contact the ground all the time to form a stable support to the vehicle body cooperates with the wheel 23 and the steering wheels 24, which avoids rollover resulted from the left or right tilt of the vehicle body during turning, improves operation stability of the whole vehicle, and makes it safer to use.

FIGS. 22-26 show a child swing steering vehicle according to still an embodiment of the present disclosure, and FIGS. 27-31 show several optional variations of the child swing steering vehicle according to still an embodiment of the present disclosure.

Referring to FIGS. 22-26, the child swing steering vehicle comprises a vehicle frame 31, a seat 32, wheels 33, steering wheels, a steering mechanism, and auxiliary wheels 35, and the steering wheels comprise a left steering wheel 341 and a right steering wheel 342 spaced in the left-right direction. The seat 32 is arranged on the vehicle frame 31 for a child to ride. The wheels 13 are arranged at the front portion of the vehicle frame 31 as front wheels and the left steering wheel 341 and the right steering wheel 342 are arranged at the rear portion of the vehicle frame 31 as rear wheels, or the left steering wheel 341 and the right steering wheel 342 may be arranged at the front portion of the vehicle frame 31 as front wheels and the wheels 33 may be arranged at the rear of the vehicle frame 31 as rear wheels. The left steering wheel 341 and the right steering wheel 342 are specifically connected to the vehicle frame 31 via the steering mechanism, and the steering mechanism is used to turn when the child's body is tilted to the left or right, and under the action of the steering mechanism, the left steering wheel 341 and the right steering wheel 342 may turn left or right as the child's body is tilted to the left or right. The left and right sides of the vehicle frame 31 are respectively provided with at least one auxiliary wheel 35 which contacts the ground when the child swing steering vehicle is turning. In the child swing steering vehicle, a space d between the midpoint of a connecting line of the center of the left steering wheel 341 and the center of the right steering wheel 342 and the wheels 33 is 400-550 mm.

Figure 23:
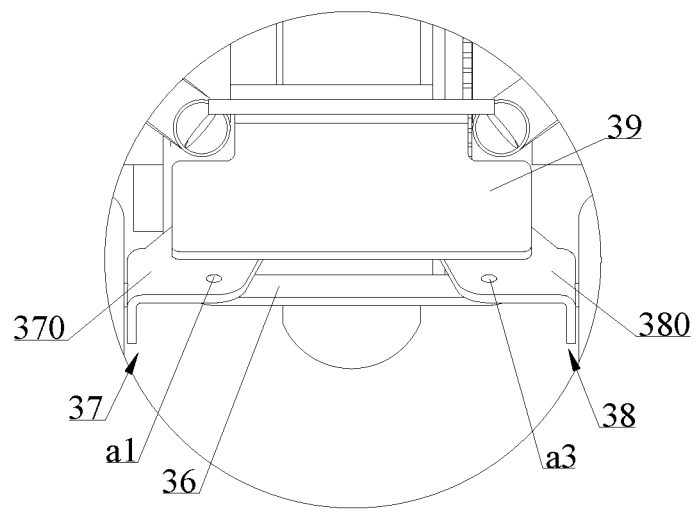
FIG. 23 is an partial enlarged view of Part A in FIG. 22.
Figure 24:
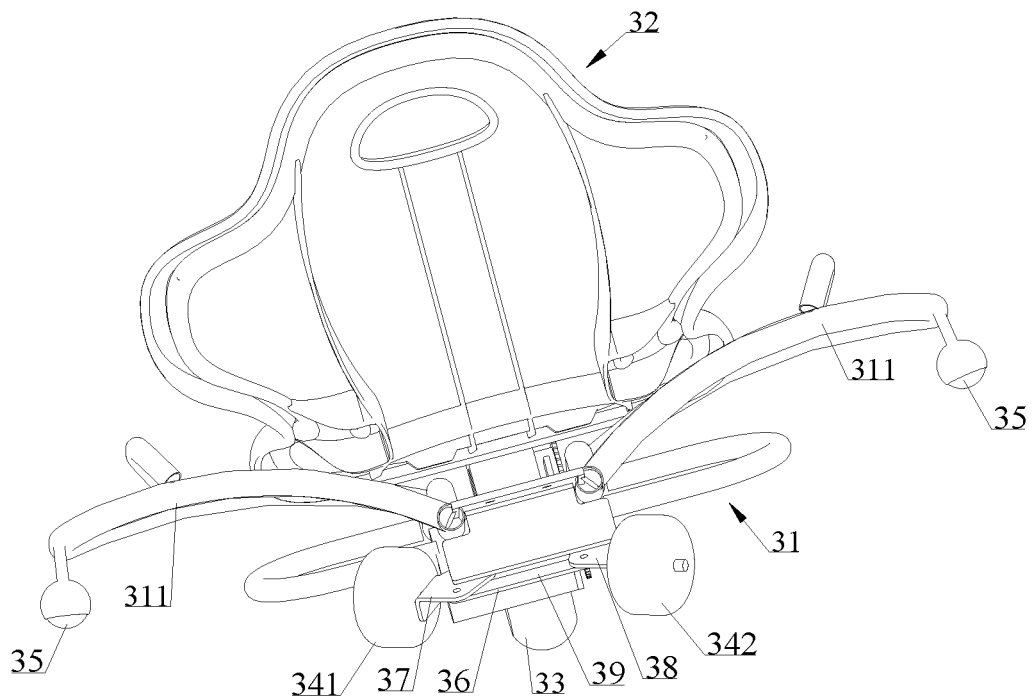
FIG. 24 is a front view of the child swing steering vehicle shown in FIG. 22 when turning.
Figure 25:
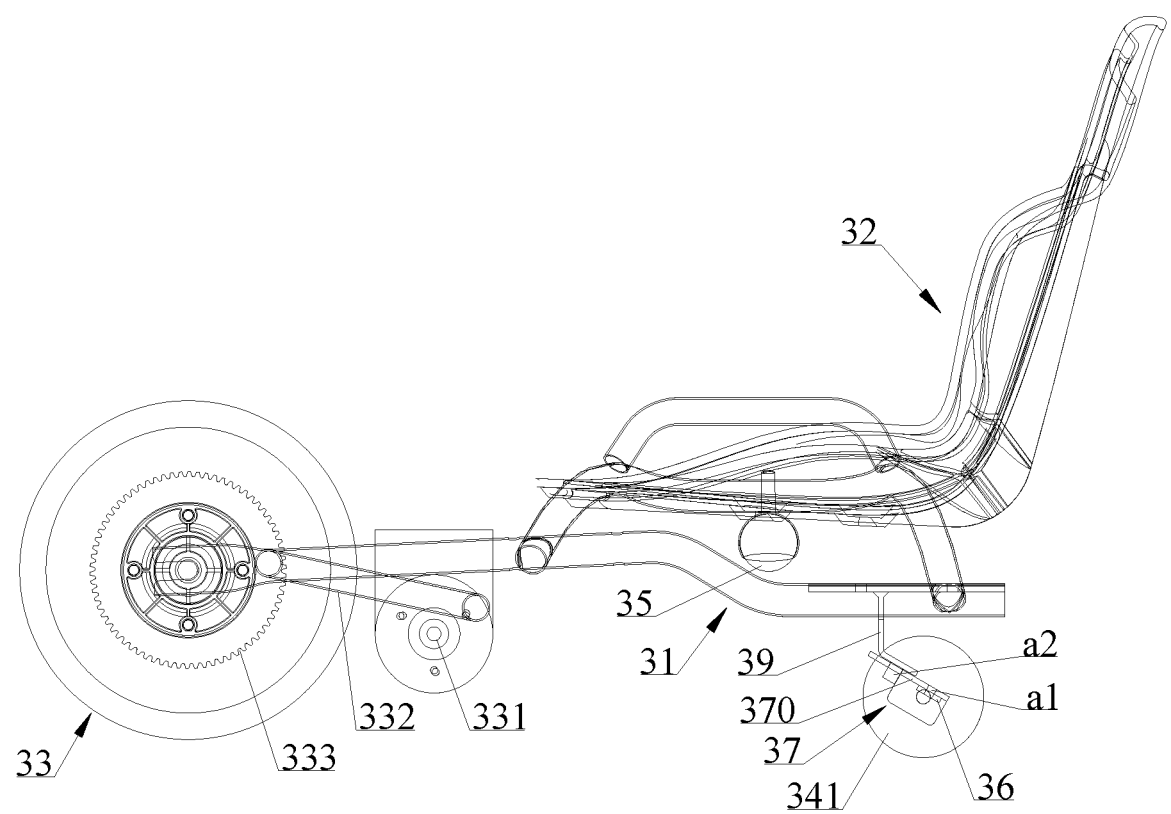
FIG. 25 is a side view of the child swing steering vehicle shown in FIG. 22.
Figure 26:
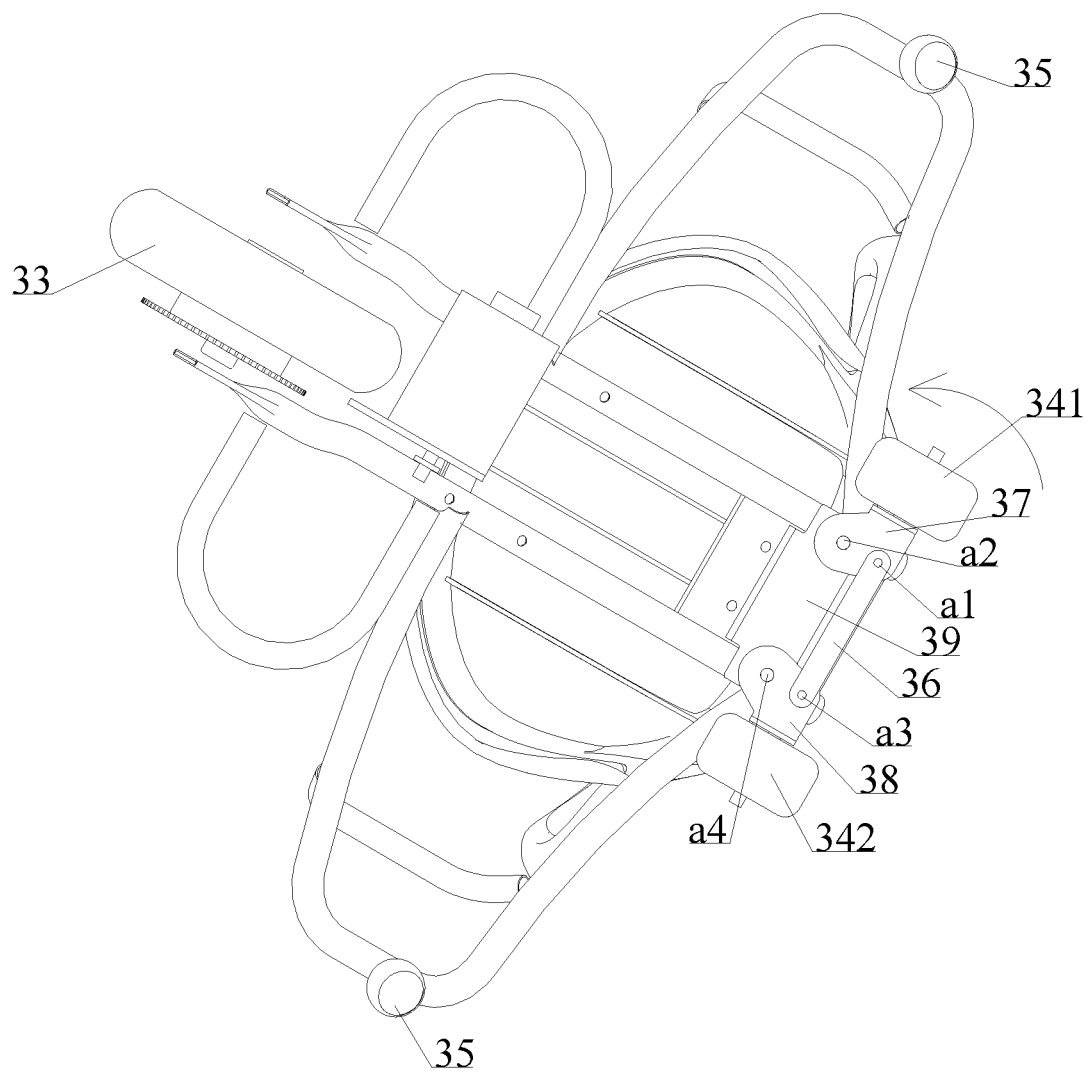
FIG. 26 is a bottom view of the child swing steering vehicle shown in FIG. 22.

Referring to FIG. 23 and FIG. 26, the steering mechanism comprises a connecting rod 36, a left connector 37 arranged on the left steering wheel 341, a right connector 38 arranged on the right steering wheel 342, and a mounting base 39 arranged on the vehicle frame 31. The left connector 37 is rotatably connected with a left end portion of the connecting rod 36 and a left end portion of the mounting base 39, respectively, and the right connector 38 is rotatably connected with a right end portion of the connecting rod 36 and a right end portion of the mounting base 39, respectively, such that the connecting rod 36, the left connector 37, the mounting base 39, and the right connector 38 form a four-bar linkage. The plane in which the four connection of the four-bar linkage are located aslant intersects the horizontal plane, in particular, an acute angle is formed between a connecting line of a rotating joint of the left connector 37 and the connecting rod 36 and a rotating joint of the left connector 37 and the mounting base 39 and a horizontal plane, and an acute angle is formed between a connecting line of a rotating joint of the right connector 38 and the connecting rod 36 and a rotating joint of the right connector 38 and the mounting base 39 and a horizontal plane.

In the embodiment, the rotating joint of the left connector 37 and the connecting rod 36 is lower than the rotating joint of the left connector 37 and the mounting base 39, and the rotating joint of the right connector 38 and the connecting rod 36 is lower than the rotating joint of the right connector 38 and the mounting base 39. The connecting rod 36 is located in rear of the mounting base 39, the left connector 37 has an connecting portion 370 aslant arranged, the right connector 38 has an connecting portion 380 aslant arranged, and the two connecting portions 370, 380 are gradually tilted downward from front to rear, as shown in FIG. 23. The connecting rod 36 and the mounting base 39 are respectively connected to the connecting portions 370, 380 of the left connector 37 and the right connector 38.

Specifically, the left connector 37 is rotatably connected with the left end portion of the connecting rod 36 via a second pivot a1, the left connector 37 is rotatably connected with the left end portion of the mounting base 39 via a third pivot a2, the right connector 38 is rotatably connected with the right end portion of the connecting rod 36 via a fourth pivot a3, and the right connector 38 is rotatably connected with the right end portion of the mounting base 39 via a fifth pivot a4.

Wherein, axis of the second pivot a1, the third pivot a2, the fourth pivot a3, and the fifth pivot a4 are parallel to each other, the second pivot a1 and the fourth pivot a3 are at the same height and axially symmetric, the third pivot a2 and the fifth pivot a4 are at the same height and axially symmetric, and the second pivot a1 and the fourth pivot a3 are lower than the third pivot a2 and the fifth pivot a4. When the child sitting on the seat tilts the body to the left, the fixed base applies a force to the left connector 37, and under the action of the four-bar linkage, the left steering wheel 341 has a torque about the third pivot a2, which generates counterclockwise rotation about the third pivot a2, as shown by the arrow in FIG. 26, to realize the left turn. When tilting to the right, it turns to the right.

Figure 22:
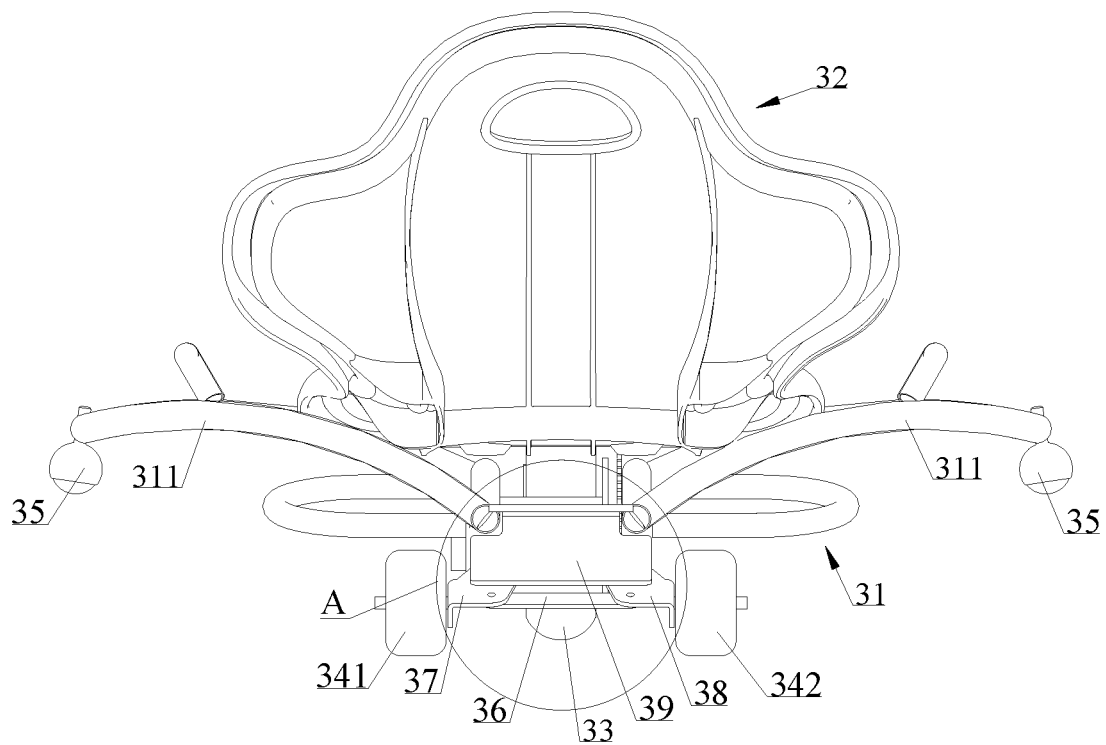
FIG. 22 is a rear view of a child swing steering vehicle when going straight according to still another embodiment of the present disclosure.

There is one or more wheels 33, and the bottom of the wheels 33 and the bottoms of the left steering wheel 341 and the right steering wheel 342 are all in the same plane (this plane specifically refers to the ground). The auxiliary wheels 35 are located on the outside of the wheels 33 and the left steering wheel 341 and the right steering wheel 342, that is, the auxiliary wheel 35 on the left side of the vehicle frame 31 is located on the left side of the wheels 33 and the left steering wheel 341, and the auxiliary wheel 35 on the right side of the vehicle frame 31 is located on the right side of the wheels 33 and the right steering wheel 342; at least when the child swing steering vehicle is turning, the bottom of the auxiliary 35 on the left or right, the bottom of the wheels 33, and the bottom of the left steering wheel 341 or the right steering wheel 342 are located in the same plane, such that when turning, the bottom of the auxiliary 35 on the left or right also contacts the ground, and form a stable support to the child swing steering vehicle together with the wheels 33 and the left steering wheel 341 or the right steering wheel 342, which avoids rollover. Specifically in the embodiment, the number of the wheels 33 is one and the wheel 33 is arranged at the front portion of the vehicle frame 31, the left steering wheel 341 and the right steering wheel 342 are arranged at the front portion of the vehicle frame 31, and the left and right sides of the vehicle frame 31 are respectively provided with one auxiliary wheel 35; when the child swing steering vehicle goes straight, the wheel 33, the left steering wheel 341 and the right steering wheel 342 touch the ground, which can form a three-point stable support to the vehicle body, the bottom of the auxiliary wheels 35 is higher than the plane in which the bottom of the wheel 33 and the bottom of the left steering wheel 341 and the right steering wheel 342 are located, as shown in FIG. 22; when the child swing steering vehicle is turning, the vehicle frame 31 and the seat 32 are tilted to the left or right, the auxiliary wheel 35 on the left or right contacts the ground, and forms a support to the vehicle body together with the wheel 33, the left steering wheel 341 and the right steering wheel 342, as shown in the schematic diagram of the left turn in FIG. 24.

The child swing steering vehicle is a child electrical vehicle, which is driven by a motor. As shown in FIG. 26, the child swing steering vehicle further comprises a driving mechanism for driving the wheel 33 to rotate, and the driving mechanism comprises a motor 331 and a transmission assembly connected between the motor 331 and the wheel 33. The transmission assembly comprises a chain 332 and a gear ring 333, and the chain 332 is arranged on two sprocket wheels, one of the sprocket wheels is arranged co-axially with an output shaft of the motor 331, and the other sprocket wheel is provided with outer gear teeth and meshes with the inner gear teeth of the gear ring 333 for transmission, and the gear ring 333 is fixedly arranged on the hub of the wheel 33, so as to drive the wheel 33.

The vehicle frame 31 specifically comprises a frame body and two handle frames 311 respectively extending from the left and right sides of the frame body, and the auxiliary wheels 35 are arranged at the bottom of the handle frames 311. In the embodiment shown in FIGS. 22-26, the auxiliary wheels 35 specifically uses ball wheels.

Figure 27:
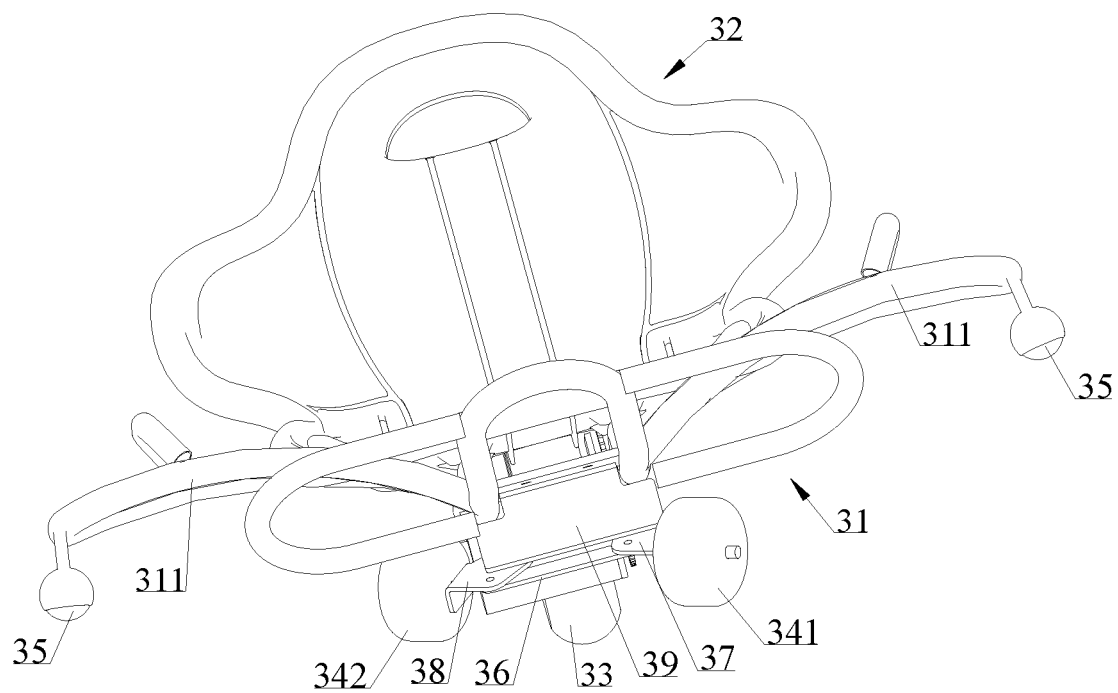
FIG. 27 is a front view of a second child swing steering vehicle when turning according to still another embodiment of the present disclosure.

FIG. 27 shows another child swing steering vehicle according to the present disclosure, and the auxiliary wheels 35 also uses ball wheels. It differs from the child swing steering vehicle shown in FIGS. 22-26 by that: the wheel 33 is arranged at the rear portion of the vehicle frame 31 as the rear wheel, the rear wheel is driven by a motor, and a rear-wheel drive mode is used; the left steering wheel 341 and the right steering wheel 342 are connected to the front portion of the vehicle frame 31 via a four-bar linkage. Wherein, the connecting rod 36 is located in front of the mounting base 39, the left connector 37 has a connecting portion aslant arranged, the right connector 38 has a connecting portion aslant arranged, and the two connecting portions are gradually tilted upward from front to rear, and the connecting rod 36 and the mounting base 39 are respectively connected to the connecting portions of the left steering wheel 341 and the right steering wheel 342. The left connector 37 is rotatably connected with the left end portion of the connecting rod 36 via a first pivot, the left connector 37 is rotatably connected with the left end portion of the mounting base 39 via a second pivot, the right connector 38 is rotatably connected with the right end portion of the connecting rod 36 via a third pivot, and the right connector 38 is rotatably connected with the right end portion of the mounting base 39 via a fourth pivot.

Figure 28:
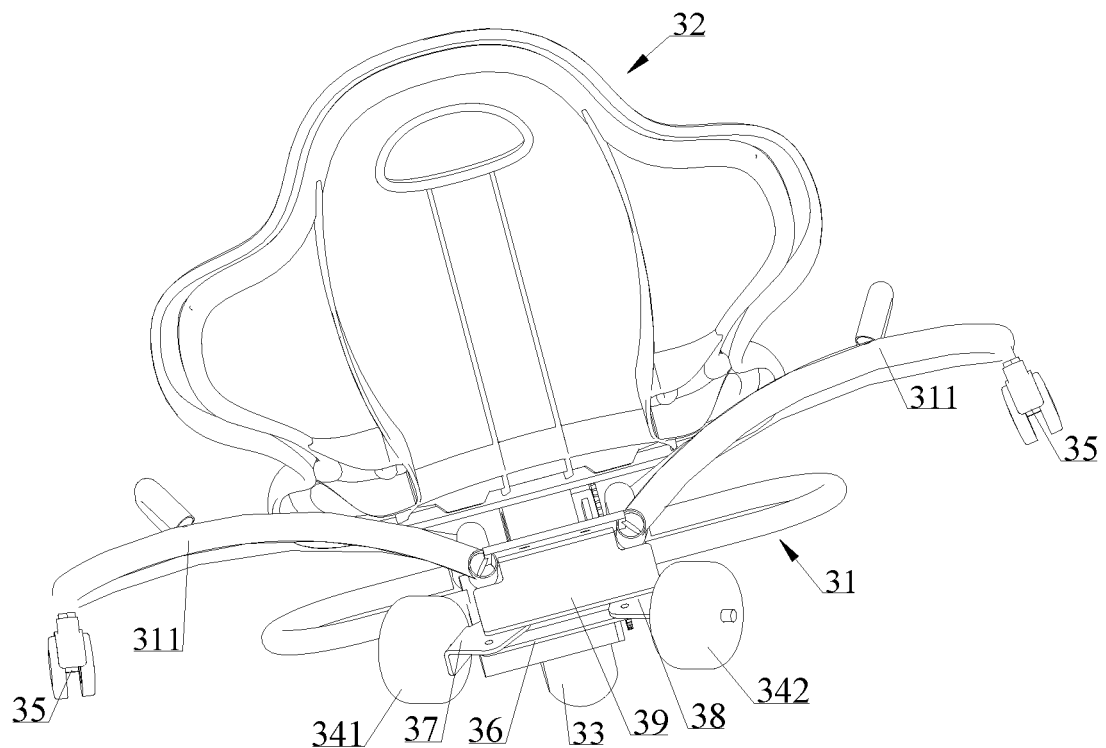
FIG. 28 is a rear view of a third child swing steering vehicle when turning according to still another embodiment of the present disclosure.
Figure 29:
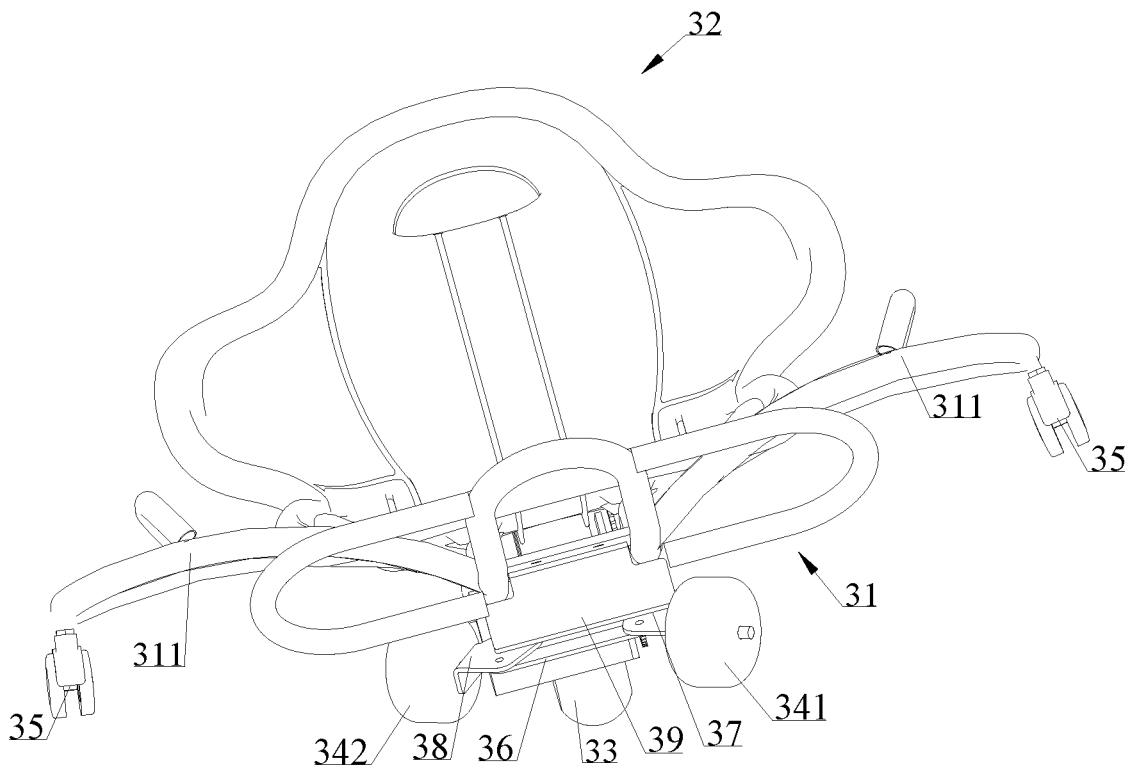
FIG. 29 is a front view of a fourth child swing steering vehicle when turning according to still another embodiment of the present disclosure.

FIGS. 28, 29 respectively show another two child swing steering vehicles of the embodiment, which differ from the child swing steering vehicle shown in FIGS. 22-26 by that: the auxiliary wheels 35 use off-centered omni-directional wheels. In the child swing steering vehicle shown in FIG. 28, the wheel 33 is arranged at the front portion of the vehicle frame 31 as the front wheel, and a front-wheel drive mode is used; the left steering wheel 341 and the right steering wheel 342 are connected to the rear portion of the vehicle frame 31 via a four-bar linkage, the structure of the four-bar linkage is the same as that shown in FIGS. 22-26. In the child swing steering vehicle shown in FIG. 29, the wheel 33 is arranged at the rear portion of the vehicle frame 31 as the rear wheel, and a rear-wheel drive mode is used; the left steering wheel 341 and the right steering wheel 342 are connected to the front portion of the vehicle frame 31 via a four-bar linkage, the structure of the four-bar linkage is the same as that shown in FIG. 27.

Figure 30:
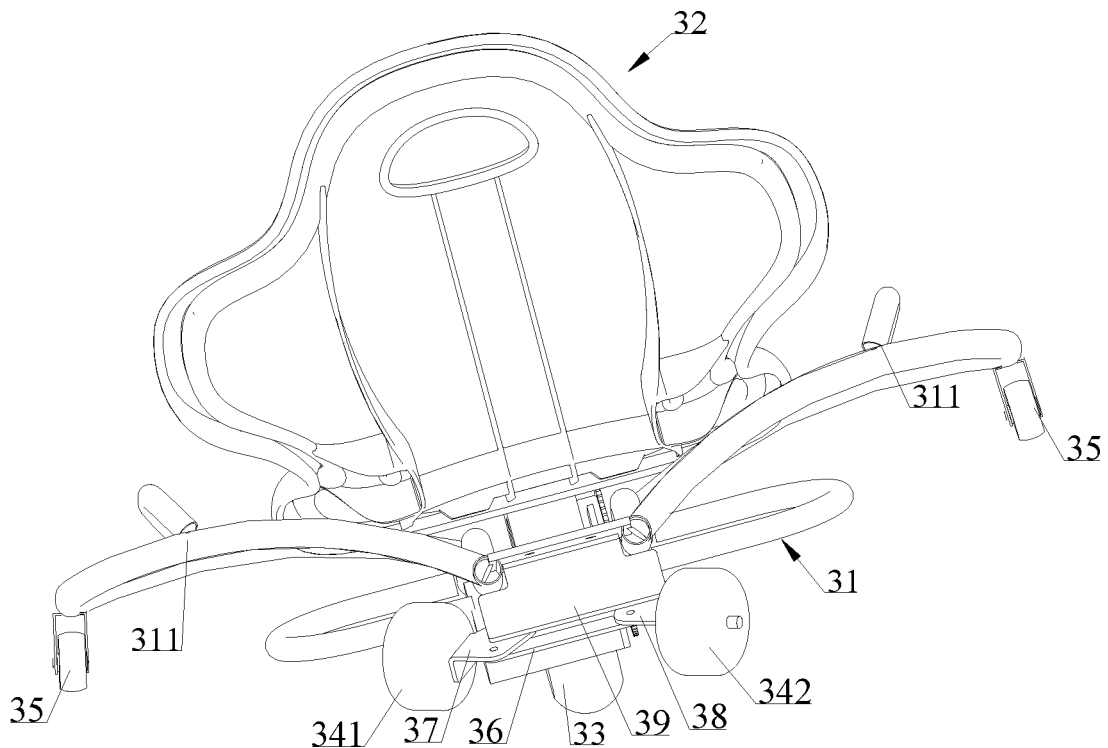
FIG. 30 is a rear view of a fifth child swing steering vehicle when turning according to still another embodiment of the present disclosure.
Figure 31:
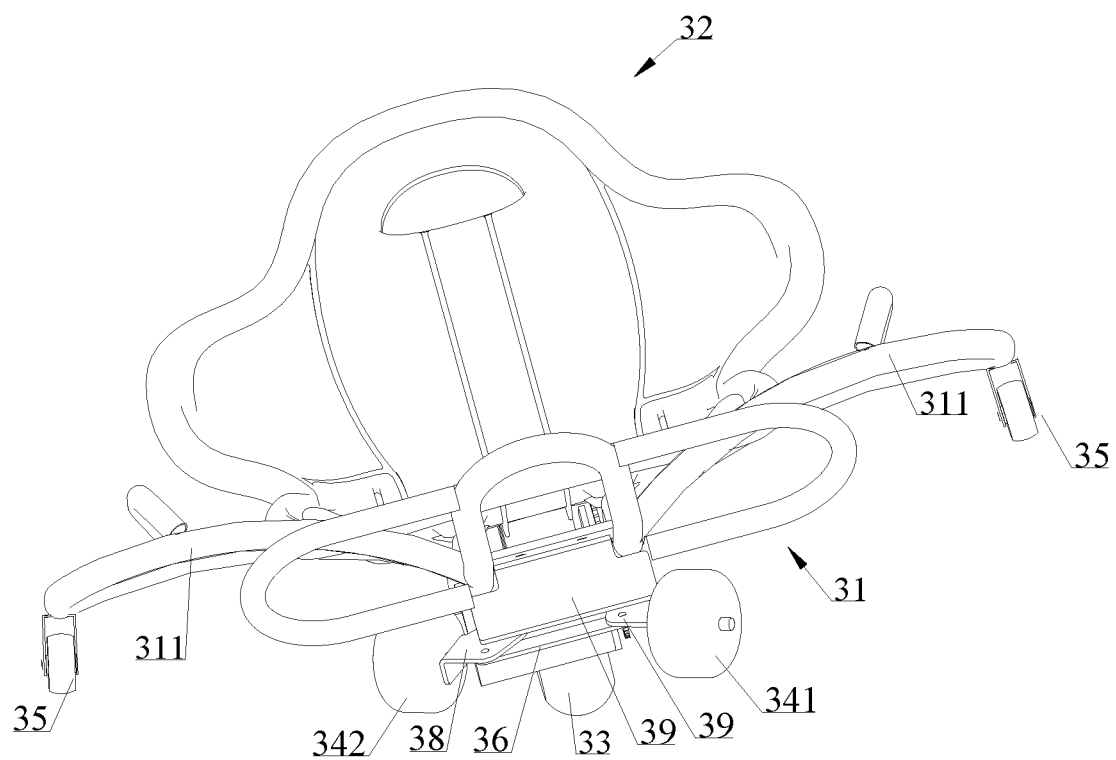
FIG. 31 is a front view of a sixth child swing steering vehicle when turning according to still another embodiment of the present disclosure.

FIGS. 30, 31 respectively show another two child swing steering vehicles of the embodiment, which differ from the child swing steering vehicle shown in FIGS. 22-26 by that: the auxiliary wheels 35 use directional wheels. In the child swing steering vehicle shown in FIG. 30, the wheel 33 is arranged at the front portion of the vehicle frame 31 as the front wheel, and a front-wheel drive mode is used; the left steering wheel 341 and the right steering wheel 342 are connected to the rear portion of the vehicle frame 31 via a four-bar linkage, the structure of the four-bar linkage is the same as that shown in FIGS. 22-26. In the child swing steering vehicle shown in FIG. 31, the wheel 33 is arranged at the rear portion of the vehicle frame 31 as the rear wheel, and a rear-wheel drive mode is used; the left steering wheel 341 and the right steering wheel 342 are connected to the front portion of the vehicle frame 31 via a four-bar linkage, the structure of the four-bar linkage is the same as that shown in FIG. 27.

For the child swing steering vehicle provided by the embodiment, when it needs to turn during driving, the child sitting on the seat 32 tilts the body to the left or right, applies an external force to the steering mechanism, the left connector or the right connector is rotated relative to the fixed base 39, the left steering wheel 341 and the right steering wheel 342 are turned to the left or the right, to realize the steering function, which has a simple structure and is easy to use; when turning, with the left or right tilt of the vehicle body, the auxiliary wheel 35 on the left or right side contacts the ground to form a stable support to the vehicle body cooperates with the wheel 33 and the left steering wheel 341 and the right steering wheel 342, to avoid rollover, improve stability during turning, and make it safer to use.

The embodiments described above are only for illustrating the technical concepts and features of the present disclosure, and are intended to make those skilled in the art being able to understand the present disclosure and thereby implement it, and should not be concluded to limit the protective scope of this disclosure. Any equivalent variations or modifications according to the spirit of the present disclosure should be covered by the protective scope of the present disclosure.

The invention claimed is:

1. A child swing steering vehicle, comprising:
a vehicle frame;
a seat arranged on the vehicle frame for a child to ride;
wheels arranged at a bottom of the vehicle frame;
steering wheels arranged in rear or front of the wheels; and
a steering mechanism adapted to steer the steering wheels when the child's body is tilted to the left or to the right, with the steering wheels being connected to the vehicle frame via the steering mechanism;
and wherein:
the child swing steering vehicle further comprises auxiliary wheels;
left and right sides of the vehicle frame are respectively provided with at least one of said auxiliary wheels;
a sum of the number of the wheels and the steering wheels is greater than or equal to three, and a bottom of the wheels and a bottom of the steering wheels are both located in a same plane;
the auxiliary wheel on the left side of the vehicle frame is located on the left side of the wheels and the steering wheels, while the auxiliary wheel on the right side of the vehicle frame is located on the right side of the wheels and the steering wheels; and
when the child swing steering vehicle is turning, a bottom of the auxiliary wheel on the side of the turn is located in the plane;
and further wherein:
the vehicle frame comprises two handle frames, with one of the two handle frames having a side portion on a left side of the seat and the other one of the two handle frames having a side portion on a right side of the seat, or, the vehicle frame comprises one handle frame with two side portions, the two side portions residing on the left and right sides of the seat, respectively; and the auxiliary wheels are arranged on the side portions of the two handle frames, or of the one handle frame, and are located between the wheels and the steering wheels in a front-rear direction.

2. The child swing steering vehicle according to claim 1, wherein:

the auxiliary wheels are ball wheels, off-centered omnidirectional wheels, or directional wheels; and the auxiliary wheels are configured such that when the child swing steering vehicle moves in a straight direction, the bottom of each of the auxiliary wheels is off of a ground surface.

3. The child swing steering vehicle according to claim 2, wherein:

the vehicle frame comprises said two handle frames and a frame body, with the frame body having a left side, and an opposing right side;

the two handle frames extend from the left and right sides of the frame body, respectively;

the two handle frames are fixedly connected to the frame body; and the auxiliary wheels are arranged at the bottom of the respective side portions of the two handle frames.

4. The child swing steering vehicle according to claim 1, wherein:

the vehicle frame comprises said one handle frame and a frame body, with the frame body having a left side, and an opposing right side;

the frame body is rotatably connected to the handle frame, with the handle frame being capable of turning left and right;

the wheels are arranged at the bottom of the frame body;

the steering wheels are arranged at the bottom of the frame body via the steering mechanism; and the auxiliary wheels are arranged at the left and right side portions of the handle frame such that:
when the child swing steering vehicle moves in a straight direction, the bottom of each of the auxiliary wheels is off of a ground surface; and
when the child swing steering vehicle is turning, the bottom of the auxiliary wheel away from a direction of the turn is off of the ground surface.

5. The child swing steering vehicle according to claim 4, wherein:

the frame body is rotatably connected to the handle frame via a first pivot; and the first pivot extends along a front-rear direction.

6. The child swing steering vehicle according to claim 1, wherein:

the steering wheels are connected with a wheel shaft;

the steering mechanism comprises a steering base fixedly connected to the wheel shaft, and a fixed base fixedly connected to the vehicle frame;

the steering base is rotatably connected with the fixed base via a rotating shaft fixed on the fixed base; and an acute angle is formed between a shaft axis of the rotating shaft and a horizontal plane so as to drive the steering base to rotate when the child's body is tilted to the left or to the right.

7. The child swing steering vehicle according to claim 6, wherein the steering mechanism further comprises a restoration device for restoring the child swing steering vehicle from turning.

8. The child swing steering vehicle according to claim 7, wherein:

the restoration device comprises a compressed spring; and one end of the compressed spring is in contact with the steering base, and the other end of the compressed spring is in contact with a pressure sheet fixedly connected to the fixed base.

9. The child swing steering vehicle according to claim 7, wherein:

the restoration device comprises a pair of compressed springs;

the steering base has a free end located between the pair of springs; and one of the springs in the pair of springs is arranged between one side of the free end and the fixed base, and the other one of the springs in the pair of springs is arranged between the other side of the free end and the fixed base.

10. The child swing steering vehicle according to claim 9, wherein:

the fixed base has a cavity;

the free end is swingably arranged in the cavity;

the free end is located between the pair of springs; and one of the springs in the pair of springs is arranged between an inner wall on one side of the cavity and a surface on one side of the free end, and the other one of the springs in the pair of springs is arranged between an inner wall on the other side of the cavity and a surface on the other side of the free end.

11. The child swing steering vehicle according to claim 6, wherein:

one of the steering base and the fixed base is provided with a raised part while the other one of the steering base and the fixed base is provided with a recess;

the raised part and the recess fit with each other;

the raised part is swingably inserted into the recess; and the recess has a pair of limit surfaces;

and wherein the child swing steering vehicle is configured such that when the raised part contacts one of the limit surfaces, the steering base stops rotating.

12. The child swing steering vehicle according to claim 6, wherein the rotating shaft is gradually tilted downward or upward from front to rear.

13. The child swing steering vehicle according to claim 1, wherein:

the steering wheels comprises a left steering wheel and a right steering wheel;

the steering mechanism comprises a connecting rod, a left connector arranged on the left steering wheel, a right connector arranged on the right steering wheel, and a mounting base arranged on the vehicle frame;

the left connector is rotatably connected with a left end portion of the connecting rod and a left end portion of the mounting base, respectively, while the right connector is rotatably connected with a right end portion of the connecting rod and a right end portion of the mounting base, respectively, such that the connecting rod, the left connector, the mounting base, and the right connector form a four-bar linkage;

and wherein:
a first acute angle is formed between a connecting line of a rotating joint of the left connector and the connecting rod and a rotating joint of the left connector and the mounting base and a horizontal plane, and
a second acute angle is formed between a connecting line of a rotating joint of the right connector and the connecting rod and a rotating joint of the right connector and the mounting base and a horizontal plane.

14. The child swing steering vehicle according to claim 13, wherein:
the rotating joint of the left connector and the connecting rod is lower than the rotating joint of the left connector and the mounting base; and
the rotating joint of the right connector and the connecting rod is lower than the rotating joint of the right connector and the mounting base.

15. The child swing steering vehicle according to claim 14, wherein:
the wheels are arranged in the front of the vehicle frame;
the left steering wheel and the right steering wheel are located in rear of the wheels; and
the connecting rod is located in rear of the mounting base.

16. The child swing steering vehicle according to claim 15, wherein:
the left connector and the right connector, respectively, have a connecting portion;
the connecting portions are gradually tilted downward from front to rear; and
the connecting rod and the mounting base are respectively connected to the connecting portions.

17. The child swing steering vehicle according to claim 14, wherein:
the wheels are arranged in the rear of the vehicle frame;
the left steering wheel and the right steering wheel are located in front of the wheels; and
the connecting rod is located in front of the mounting base.

18. The child swing steering vehicle according to claim 17, wherein:
the left connector and the right connector, respectively, have a connecting portion;
the connecting portions are gradually tilted upward from front to rear; and
the connecting rod and the mounting base are respectively connected to the connecting portions.

19. The child swing steering vehicle according to claim 1, further comprising:
a driving mechanism for driving the wheels to rotate, wherein the driving mechanism comprises a motor, and a transmission assembly connected between the motor and the wheels.

20. The child swing steering vehicle according to claim 1, wherein a space between the centers of the steering wheels and the wheels is 400-550 mm.

* * * * *